(12) United States Patent
Hamasaki et al.

(10) Patent No.: US 9,997,805 B2
(45) Date of Patent: Jun. 12, 2018

(54) ELECTROLYTE AND LITHIUM-ION SECONDARY BATTERY

(71) Applicant: ASAHI KASEI KABUSHIKI KAISHA, Tokyo (JP)

(72) Inventors: Shinya Hamasaki, Tokyo (JP); Fumiaki Ozaki, Tokyo (JP); Yusuke Shigemori, Tokyo (JP); Masato Murakami, Tokyo (JP); Asami Ohashi, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 134 days.

(21) Appl. No.: 15/025,192

(22) PCT Filed: Sep. 30, 2014

(86) PCT No.: PCT/JP2014/076213
§ 371 (c)(1),
(2) Date: Mar. 25, 2016

(87) PCT Pub. No.: WO2015/050142
PCT Pub. Date: Apr. 9, 2015

(65) Prior Publication Data
US 2016/0240888 A1 Aug. 18, 2016

(30) Foreign Application Priority Data

Oct. 4, 2013 (JP) .................................. 2013-209009
Oct. 4, 2013 (JP) .................................. 2013-209015

(51) Int. Cl.
*H01M 6/14* (2006.01)
*H01M 10/0567* (2010.01)
(Continued)

(52) U.S. Cl.
CPC ....... *H01M 10/0567* (2013.01); *H01M 4/505* (2013.01); *H01M 4/525* (2013.01);
(Continued)

(58) Field of Classification Search
CPC ...................................................... H01M 6/04
See application file for complete search history.

(56) References Cited

U.S. PATENT DOCUMENTS

2002/0081496 A1* 6/2002 Tsujioka ................. C07F 5/022
429/307
2004/0007688 A1* 1/2004 Awano .................. H01M 6/168
252/62.2

(Continued)

FOREIGN PATENT DOCUMENTS

JP 7-6786 A 1/1995
JP 2000-515672 A 11/2000
(Continued)

OTHER PUBLICATIONS

Partial Supplementary European Search Report, dated Sep. 26, 2016, for corresponding European Application No. 14850357.6.
(Continued)

*Primary Examiner* — Jacob Marks
(74) *Attorney, Agent, or Firm* — Birch, Stewart, Kolasch & Birch, LLP

(57) ABSTRACT

An electrolyte containing a non-aqueous solvent, a lithium salt (A) and at least one compound (B) selected from the group consisting of a compound represented by the following formula (1), a compound represented by the following formula (2) and a compound having a constitutional unit represented by the following formula (3a) and a constitutional unit represented by the following formula (3b).

9 Claims, 1 Drawing Sheet

(51) Int. Cl.
  *H01M 4/505* (2010.01)
  *H01M 4/525* (2010.01)
  *H01M 10/052* (2010.01)
  *H01M 10/0568* (2010.01)
  *H01M 10/0569* (2010.01)
  *H01M 4/58* (2010.01)
  *H01M 10/0525* (2010.01)

(52) U.S. Cl.
  CPC ....... *H01M 4/5825* (2013.01); *H01M 10/052* (2013.01); *H01M 10/0525* (2013.01); *H01M 10/0568* (2013.01); *H01M 10/0569* (2013.01); H01M 2300/0025 (2013.01); Y02T 10/7011 (2013.01)

(56) References Cited

U.S. PATENT DOCUMENTS

| | | | |
|---|---|---|---|
| 2008/0070122 A1* | 3/2008 | Park | H01M 4/131 429/330 |
| 2010/0255370 A1* | 10/2010 | Kim | H01M 4/364 429/199 |
| 2012/0315534 A1 | 12/2012 | Bhat et al. | |
| 2012/0315549 A1 | 12/2012 | Tang et al. | |
| 2013/0136997 A1 | 5/2013 | An et al. | |
| 2013/0224535 A1 | 8/2013 | Matsuoka et al. | |
| 2013/0330610 A1 | 12/2013 | Shigematsu et al. | |
| 2015/0010831 A1 | 1/2015 | Noguchi et al. | |
| 2015/0125761 A1 | 5/2015 | Shimamoto et al. | |

FOREIGN PATENT DOCUMENTS

| | | |
|---|---|---|
| JP | 2004-87459 A | 3/2004 |
| JP | 2004-171981 A | 6/2004 |
| JP | 2009-163939 A | 7/2009 |
| JP | 2013-62089 A | 4/2013 |
| JP | 2013-98057 A | 5/2013 |
| JP | 2013-152825 A | 8/2013 |
| JP | 2013-536547 A | 9/2013 |
| WO | WO 98/04010 A1 | 1/1998 |
| WO | WO 2011/059458 A1 | 5/2011 |
| WO | WO 2012/057311 A1 | 5/2012 |
| WO | WO 2012/108505 A1 | 8/2012 |
| WO | WO 2012/170688 A2 | 12/2012 |
| WO | WO 2013/114946 A1 | 8/2013 |
| WO | WO 2013/168821 A1 | 11/2013 |

OTHER PUBLICATIONS

International Search Report for PCT/JP2014/076213 dated Dec. 22, 2014.
Written Opinion of the International Searching Authority for PCT/JP2014/076213 (PCT/ISA/237) dated Dec. 22, 2014.
English Translation of International Preliminary Report on Patentability and Written Opinion of the International Searching Authority (Forms PCT/IB/326, PCT/IB/373 and PCT/ISA/237), dated Apr. 14, 2016, for International Application No. PCT/JP2014/076213.
Supplementary European Search Report, dated Jan. 31, 2017, for European Application No. 14850357.6.

* cited by examiner

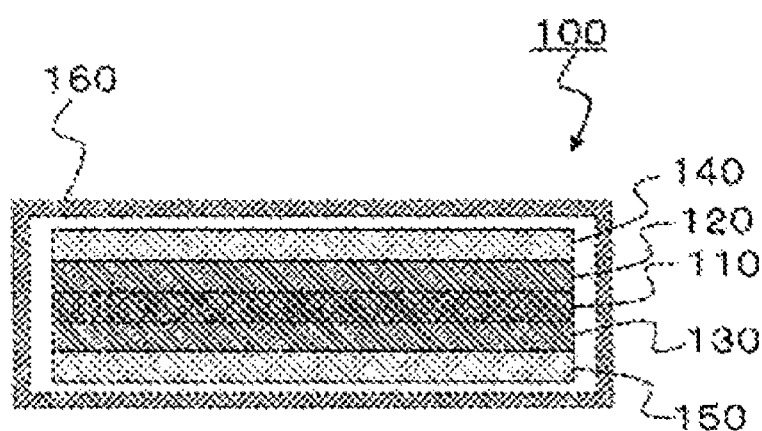

ELECTROLYTE AND LITHIUM-ION SECONDARY BATTERY

TECHNICAL FIELD

The present invention relates to an electrolyte and a lithium-ion secondary battery using the electrolyte.

BACKGROUND ART

Recently, with the development of electronic engineering and increased concern for environmental technology, a wide variety of electrochemical devices have been used. In particular, saving energy is most strongly demanded. In the context, it has been increasingly desired to develop techniques that can contribute to energy saving. A lithium-ion secondary battery, which is a representative electricity storage device, has so far been used mainly as a secondary battery for portable devices; however, it has lately been expected to use a lithium-ion secondary battery as batteries for hybrid cars and electric cars.

In conventional lithium-ion secondary batteries operated at around 4 V, a non-aqueous electrolyte having a lithium salt dissolved in a non-aqueous solvent having a carbonate solvent as a main component, has been widely used (see, for example, Patent Document 1). The feature of the electrolyte containing a carbonate solvent resides in good balance between oxidation resistance and reduction resistance and excellent lithium-ion conductivity at a voltage of around 4 V.

It has been desired for lithium-ion secondary batteries to have a further higher energy density. To realize higher energy density, investigation has been made with a view to increasing voltage of the batteries. To increase the voltage of a battery, a positive electrode that can be operated at a high potential must be used. More specifically, various positive-electrode active materials operable particularly at 4.4 V (vsLi/Li$^+$) or more, have been proposed (see, for example, Patent Document 2).

CITATION LIST

Patent Documents

Patent Document 1: Japanese Patent Laid-Open No. 7-006786
Patent Document 2: National Publication of International Patent Application No. 2000-515672

SUMMARY

Technical Problem

A lithium-ion secondary battery having a positive electrode containing a positive-electrode active material operated at a high potential of 4.4 V (vsLi/Li$^+$) or more, in short, a high-voltage lithium-ion secondary battery, has a problem in that a carbonate solvent contained in the electrolyte is oxidatively decomposed on the surface of the positive electrode, reducing the cycle life of the battery. However, countermeasures against such short cycle life are not provided. In the context, it has been desired to develop an electrolyte improving the cycle life of a high-voltage lithium-ion secondary battery and a lithium-ion secondary battery containing the same.

The present invention was made in view of these circumstances and directed to providing a lithium-ion secondary battery operated at a high voltage and having a long cycle life, and an electrolyte for a non-aqueous electricity storage device, which can realize such lithium-ion secondary battery.

Solution to Problem

The present inventors conducted intensive studies with a view to attaining the aforementioned object. As a result, we found that the aforementioned problem can be attained when an electrolyte containing a non-aqueous solvent, a lithium salt and a compound having a specific structure is used, and accomplished the present invention.

More specifically, the present invention is as follows.
[1] An electrolyte comprising:
  a non-aqueous solvent;
  a lithium salt (A); and
  at least one compound (B) selected from the group consisting of a compound represented by the following formula (1), a compound represented by the following formula (2) and a compound having a constitutional unit represented by the following formula (3a) and a constitutional unit represented by the following formula (3b),

(1)

wherein X represents a Li atom or a hydrogen atom; M represents a P atom or a B atom; n represents an integer of 0 when M represents a B atom, and n represents an integer of 0 or 1 when M represents a P atom; and R$^1$ and R$^2$ each independently represent a group selected from the group consisting of an OH group, an OLi group, an alkyl group having 1 to 10 carbon atoms, which may have a substituent, an alkoxy group having 1 to 10 carbon atoms, which may have a substituent, an aryl group having 6 to 10 carbon atoms, which may have a substituent, an aryloxy group having 6 to 10 carbon atoms, which may have a substituent, and an siloxy group having 3 to 10 carbon atoms,

(2)

wherein X represents a Li atom or a hydrogen atom; and R$^3$ represents a hydrocarbon group having 1 to 20 carbon atoms, which may have a substituent,

(3a)

(3b)

wherein $R^4$ represents a group selected from the group consisting of an OH group, an OLi group, an alkyl group having 1 to 10 carbon atoms, which may have a substituent, an alkoxy group having 1 to 10 carbon atoms, which may have a substituent, an aryl group having 6 to 10 carbon atoms, which may have a substituent, an aryloxy group having 6 to 10 carbon atoms, which may have a substituent, and an siloxy group having 3 to 10 carbon atoms; and X represents a Li atom or a hydrogen atom.

[2] The electrolyte according to the above [1], wherein the content of the compound (B) based on 100 mass % of the electrolyte is 0.010 mass % or more and 10 mass % or less.

[3] The electrolyte according to the above [1] or [2], wherein the lithium salt (A) comprises a lithium salt (C) having a boron atom and represented by the following formula (4),

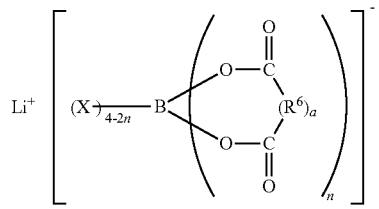
(4)

wherein a plurality of X each independently represent a halogen atom selected from the group consisting of a fluorine atom, a chlorine atom and a bromine atom; and a plurality of $R^6$ each independently represent a hydrocarbon group having 1 to 10 carbon atoms, which may have a substituent, a represents an integer of 0 or 1, and n represents an integer of 0 to 2.

[4] The electrolyte according to any one of the above [1] to [3], wherein the lithium salt (A) comprises at least one lithium salt selected from the group consisting of lithium difluorophosphate and lithium monofluorophosphate.

[5] The electrolyte according to any one of the above [1] to [4], wherein the non-aqueous solvent comprises a cyclic carbonate and a linear carbonate.

[6] The electrolyte according to the above [5], wherein
the cyclic carbonate comprises at least one selected from the group consisting of ethylene carbonate and propylene carbonate; and
the linear carbonate comprises at least one selected from the group consisting of dimethyl carbonate, diethyl carbonate and ethyl methyl carbonate.

[7] A lithium-ion secondary battery having:
a positive electrode comprising a positive-electrode active material;
a negative electrode comprising a negative-electrode active material; and the electrolyte according to any one of the above [1] to [6].

[8] The lithium-ion secondary battery according to the above [7], wherein the positive-electrode active material has a discharge capacity of 10 mAh/g or more at a potential of 4.4 V (vsLi/Li$^+$) or more.

[9] The lithium-ion secondary battery according to the above [7] or [8], wherein the positive-electrode active material comprises at least one selected from the group consisting of an oxide represented by formula (5), an oxide represented by formula (6), a composite oxide represented by formula (7), a compound represented by formula (8) and a compound represented by formula (9), $$LiMn_{2-x}Ma_xO_4 \quad (5)$$

wherein Ma represents at least one selected from the group consisting of transition metals and x satisfies 0.2≤x≤0.7, $$LiMn_{1-u}Me_uO_2 \quad (6)$$

wherein Me represents at least one selected from the group consisting of transition metals excluding Mn and u satisfies 0.1≤u≤0.9, $$zLi_2McO_3\text{-}(1-z)LiMdO_2 \quad (7)$$

wherein Mc and Md each independently represent at least one selected from the group consisting of transition metals and z satisfies 0.1≤z≤0.9, $$LiMb_{1-y}Fe_yPO_4 \quad (8)$$

wherein Mb represents at least one selected from the group consisting of Mn and Co and y satisfies 0≤y≤0.9, $$Li_2MfPO_4F \quad (9)$$

wherein Mf represents at least one selected from the group consisting of transition metals.

[10] The lithium-ion secondary battery according to any one of the above [7] to [9], wherein the positive-electrode potential in terms of lithium standard at the time of full charge is 4.4 V (vsLi/Li$^+$) or more.

[11] An electrolyte comprising: a non-aqueous solvent; a lithium salt (A); and a compound (D) having a silicon atom and represented by the following formula (10) and/or the following formula (11), wherein
the content of the compound (D) having a silicon atom is 0.0010 mass % or more and 3.0 mass % or less, $$SiFR^1R^2R^3 \quad (10)$$

wherein $R^1$, $R^2$ and $R^3$ each independently represent a hydrocarbon group having 1 to 10 carbon atoms, which may have a substituent, $$SiF_2R^4R^5 \quad (11)$$

wherein $R^4$ and $R^5$ each independently represent a hydrocarbon group having 1 to 10 carbon atoms, which may have a substituent.

[12] The electrolyte according to the above [11], comprising a compound (E) which is an acid selected from the group consisting of sulfonic acid, carboxylic acid, and protonic acid having a phosphorus atom and/or a boron atom, wherein at least one hydrogen of the acid is replaced with a substituent represented by the following formula (12),

(12)

wherein $R^3$, $R^4$ and $R^5$ each independently represent an organic group having 1 to 10 carbon atoms, which may have a substituent.

[13] The electrolyte according to the above [12], wherein the compound (E) comprises a compound represented by the following formula (13) and/or the following formula (14),

(13)

wherein M represents a phosphorus atom or a boron atom; n represents 0 or 1 when M represents a phosphorus atom and n represents 0 when M represents a boron atom; $R^3$, $R^4$ and $R^5$ each independently represent an organic group having 1 to 10 carbon atoms, which may have a substituent; and $R^6$ and $R^7$ each independently represent a group selected from the group consisting of an OH group, an OLi group, an alkyl group having 1 to 10 carbon atoms, which may have a substituent, an alkoxy group having 1 to 10 carbon atoms, which may have a substituent, a siloxy group having 3 to 10 carbon atoms, an aryl group having 6 to 15 carbon atoms and an aryloxy group having 6 to 15 carbon atoms,

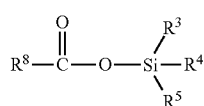

(14)

wherein $R^3$, $R^4$ and $R^5$ each independently represent an organic group having 1 to 10 carbon atoms, which may have a substituent; and $R^8$ represents an organic group having 1 to 20 carbon atoms, which may have a substituent.

[14] The electrolyte according to the above [12] or [13], wherein the content of the compound (E) based on to 100 mass % of the electrolyte is 0.010 mass % or more and 10 mass % or less.

[15] The electrolyte according to any one of the above [11] to [14], wherein the lithium salt (A) comprises $LiPF_6$.

[16] The electrolyte according to any one of the above [11] to [15], wherein the lithium salt (A) comprises at least one selected from the group consisting of lithium difluorophosphate and lithium monofluorophosphate.

[17] The electrolyte according to any one of the above [1] to [16], wherein the lithium salt (A) comprises a lithium salt (C) having a boron atom and represented by the following formula (4),

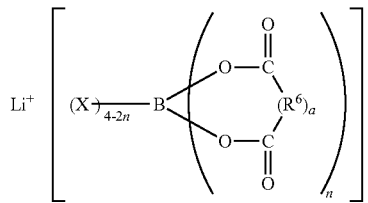

(4)

wherein a plurality of X each independently represent a halogen atom selected from the group consisting of a fluorine atom, a chlorine atom and a bromine atom; a plurality of $R^6$ each independently represent a hydrocarbon group having 1 to 10 carbon atoms, which may have a substituent; a represents an integer of 0 or 1; and n represents an integer of 0 to 2.

[18] The electrolyte according to any one of the above [11] to [17], wherein the non-aqueous solvent comprises a cyclic carbonate and a linear carbonate.

[19] The electrolyte according to the above [18], wherein the cyclic carbonate comprises at least one selected from the group consisting of ethylene carbonate and propylene carbonate; and the linear carbonate comprises at least one selected from the group consisting of dimethyl carbonate, diethyl carbonate and ethyl methyl carbonate.

[20] A lithium-ion secondary battery comprising:
a positive electrode having a positive-electrode active material having a discharge capacity of 10 mAh/g or more at a potential of 4.4 V (vsLi/Li$^+$) or more;
a negative electrode having a negative-electrode active material; and
the electrolyte according to any one of the above [11] to [19].

[21] The lithium-ion secondary battery according to the above [20], wherein the positive-electrode potential in terms of lithium standard at the time of full charge is 4.4 V (vsLi/Li$^+$) or more.

[22] The lithium-ion secondary battery according to the above [20] or [21], wherein the positive-electrode active material comprises at least one selected from the group consisting of an oxide represented by the following formula (5), an oxide represented by the following formula (6), a composite oxide represented by the following formula (7), a compound represented by the following formula (8) and a compound represented by formula (9),

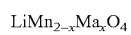 (5)

wherein Ma represents at least one selected from the group consisting of transition metals and x satisfies $0.2 \leq x \leq 0.7$,

 (6)

wherein Me represents at least one selected from the group consisting of transition metals excluding Mn and u satisfies $0.1 \leq u \leq 0.9$,

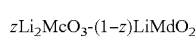 (7)

wherein Mc and Md each independently represent at least one selected from the group consisting of transition metals and z satisfies 0.1 z 0.9,

 (8)

wherein Mb represents at least one selected from the group consisting of Mn and Co and y satisfies $0 \leq y \leq 0.9$,

 (9)

wherein Mf represents at least one selected from the group consisting of transition metals.

Advantageous Effects of Invention

According to the present invention, it is possible to provide a lithium-ion secondary battery operated at a high voltage and having a long cycle life, and an electrolyte that can provide such lithium-ion secondary battery.

BRIEF DESCRIPTION OF DRAWINGS

FIG. 1 shows a schematic sectional view of a lithium-ion secondary battery according to the present embodiment of the invention.

DESCRIPTION OF EMBODIMENTS

Now, an embodiment for carrying out the invention (hereinafter referred to simply as "the present embodiment") will be more specifically described, if necessary, referring to the drawing. The following present embodiment is just an example for explaining the present invention and will not be construed as limiting the invention. The present invention can be carried out by appropriately modifying it within the range of the invention. It should be noted that the positional relationship such as left/right and top/bottom, is described based on the positional relationship shown in the drawing, unless otherwise specified, and that the dimensional ratio of the battery is not limited to the dimensional ratio shown in the drawing.

First Embodiment: Electrolyte The electrolyte according to the first embodiment comprises:
a non-aqueous solvent;
a lithium salt (A); and
at least one compound (B) selected from the group consisting of a compound represented by the following formula (1), a compound represented by the following formula (2) and a compound having a constitutional unit represented by the following formula (3a) and a constitutional unit represented by the following formula (3b).

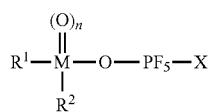
(1)

(In the above formula (1), X represents a Li atom or a hydrogen atom; M represents a P atom or a B atom, and when M represents a B atom, n represents an integer of 0, and when M represents a P atom, n represents an integer of 0 or 1; and $R^1$ and $R^2$ each independently represent a group selected from the group consisting of an OH group, an OLi group, an alkyl group having 1 to 10 carbon atoms, which may have a substituent, an alkoxy group having 1 to 10 carbon atoms, which may have a substituent, an aryl group having 6 to 10 carbon atoms, which may have a substituent, an aryloxy group having 6 to 10 carbon atoms, which may have a substituent, and an siloxy group having 3 to 10 carbon atoms).

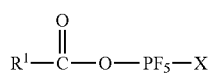
(2)

(In the above formula (2), X represents a Li atom or a hydrogen atom; and $R^3$ represents a hydrocarbon group having 1 to 20 carbon atoms, which may have a substituent).

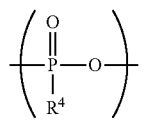
(3a)

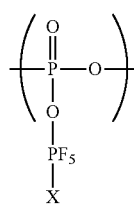
(3b)

(In the above formula (3a), $R^4$ represents a group selected from the group consisting of an OH group, an OLi group, an alkyl group having 1 to 10 carbon atoms, which may have a substituent, an alkoxy group having 1 to 10 carbon atoms, which may have a substituent, an aryl group having 6 to 10 carbon atoms, which may have a substituent, an aryloxy group having 6 to 10 carbon atoms, which may have a substituent, and an siloxy group having 3 to 10 carbon atoms; and, in the above formula (3b), X represents a Li atom or a hydrogen atom).

<Non-Aqueous Solvent>

The electrolyte according to the first embodiment contains a non-aqueous solvent. As the non-aqueous solvent, which is not particularly limited, for example, an aprotic polar solvent can be mentioned. Examples of the aprotic polar solvent include, but are not particularly limited to, a cyclic carbonate such as ethylene carbonate, propylene carbonate, 1,2-butylene carbonate, 2,3-butylene carbonate, 1,2-pentylene carbonate, 2,3-pentylene carbonate, trifluoromethyl ethylene carbonate, fluoroethylene carbonate and 4,5-difluoroethylene carbonate; a lactone such as γ-butyrolactone and γ-valerolactone; a cyclic sulfone such as sulfolane; a cyclic ether such as tetrahydrofuran and dioxane; a linear carbonate such as ethyl methyl carbonate, dimethyl carbonate, diethyl carbonate, methyl propyl carbonate, methyl isopropyl carbonate, dipropyl carbonate, methyl butyl carbonate, dibutyl carbonate, ethyl propyl carbonate and methyl trifluoroethyl carbonate; a nitrile such as acetonitrile; a linear ether such as dimethyl ether; a linear carboxylic acid ester such as methyl propionate; and a linear diether such as dimethoxyethane.

(Carbonate)

As the non-aqueous solvent, which is not particularly limited, for example, a carbonate solvent, such as cyclic carbonate and linear carbonate, is more preferably used. As the carbonate solvent, it is further preferable to use a cyclic carbonate and a linear carbonate in combination. If such carbonate is contained, ion conductivity tends to be more improved.

(Cyclic Carbonate)

Examples of the cyclic carbonate include, but are not particularly limited to, ethylene carbonate, propylene carbonate, 1,2-butylene carbonate, 2,3-butylene carbonate, 1,2-pentylene carbonate, 2,3-pentylene carbonate, trifluoromethyl ethylene carbonate, fluoroethylene carbonate and 4,5-difluoroethylene carbonate. Of these, at least one selected from the group consisting of ethylene carbonate and propylene carbonate is preferable. If such cyclic carbonate is contained, the ion conductivity of the electrolyte tends to be more improved.

(Linear Carbonate)

Examples of the linear carbonate include, but are not particularly limited to, ethyl methyl carbonate, dimethyl carbonate, diethyl carbonate, methyl propyl carbonate, methyl isopropyl carbonate, dipropyl carbonate, methyl butyl carbonate, dibutyl carbonate, ethyl propyl carbonate and methyl trifluoroethyl carbonate. Of these, at least one selected from the group consisting of dimethyl carbonate, diethyl carbonate and ethyl methyl carbonate is preferable. If such linear carbonate is contained, the ion conductivity of the electrolyte tends to be more improved.

In the case of containing a cyclic carbonate and a linear carbonate in combination as a carbonate solvent, the mixing ratio (in terms of volume ratio) of the cyclic carbonate and the linear carbonate is preferably 1:10 to 5:1, more preferably 1:5 to 3:1 and further preferably 1:5 to 1:1. If the mixing ratio of a cyclic carbonate and a linear carbonate is within the range, the ion conductivity of the resultant lithium-ion secondary battery tends to be more improved.

When a carbonate solvent is used, another non-aqueous solvent such as acetonitrile and sulfolane can further be used in combination, if necessary. If the non-aqueous solvent as mentioned above is used, the properties of the lithium-ion secondary battery tend to be more improved.

Non-aqueous solvents can be used singly or in combination of two or more.

<Lithium Salt (A)>

The electrolyte of the first embodiment contains a lithium salt (A). The content of the lithium salt (A) based on the electrolyte (100 mass %) is preferably 1.0 mass % or more, more preferably 5.0 mass % or more and further preferably 7.0 mass % or more. If the content of the lithium salt (A) is 1.0 mass % or more, the ion conductivity of the lithium-ion secondary battery tends to be more improved. In contrast, the content of the lithium salt (A) based on the electrolyte (100 mass %) is preferably 40 mass % or less, more preferably 35 mass % or less and further preferably 30 mass % or less. If the content of the lithium salt (A) is 40 mass % or less, the solubility of the lithium salt (A) at low temperature tends to be more improved. The content of the lithium salt (A) in an electrolyte can be determined by NMR measurement such as $^{19}$F-NMR and $^{31}$P-NMR measurement. The content of the lithium salt (A) in the electrolyte of a lithium-ion secondary battery can be determined similarly to the above, i.e., by the NMR measurement such as $^{19}$F-NMR and $^{31}$P-NMR measurement.

Examples of the lithium salt (A) include, but are not particularly limited to, $LiPF_6$, $LiClO_4$, $LiAsF_6$, $Li_2SiF_6$, $LiOSO_2C_kF_{2k+1}$ where k is an integer of 1 to 8, $LiN(SO_2C_kF_{2k+1})_2$ where k is an integer of 1 to 8, $LiPF_n(C_kF_{2k+1})_{6-n}$ where n is an integer of 1 to 5 and k is an integer of 1 to 8, $LiPF_4(C_2O_2)$ and $LiPF_2(C_2O_2)_2$. Of these, $LiPF_6$, $LiOSO_2C_kF_{2k+1}$ where k is an integer of 1 to 8, $LiN(SO_2C_kF_{2k+1})_2$ where k is an integer of 1 to 8, $LiPF_n(C_kF_{2k+1})_{6-1}$ where n is an integer of 1 to 5 and k is an integer of 1 to 8, $LiPF_4(C_2O_2)$ and $LiPF_2(C_2O_2)_2$ are preferable. Furthermore, $LiPF_6$ is more preferably contained as the lithium salt (A). If such lithium salt (A) is used, the ion conductivity of the lithium-ion secondary battery tends to be more improved.

As the lithium salt (A), a lithium salt (C) having a boron atom (described later) and/or lithium difluorophosphate and lithium monofluorophosphate may be contained in addition to or in place of the aforementioned lithium salt.

<Lithium Salt (C) Having a Boron Atom>

As the lithium salt (A), a lithium salt (C) having a boron atom and represented by formula (3), is preferably contained. If such lithium salt is contained, the cycle life of the lithium-ion secondary battery tends to be more improved. The reason for this is unknown; however, a lithium salt (C) having a boron atom presumably works in concert with a compound (B) on either one or both of a positive electrode and a negative electrode to suppress oxidative decomposition of the electrolyte in the lithium-ion secondary battery. The lithium salt (C) having a boron atom not only serves as an electrolyte component responsible for ion conductivity but also serves as an additive mainly for improving a cycle life.

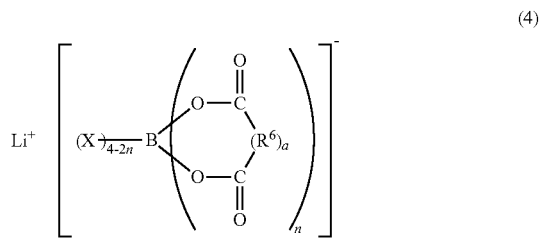

(4)

(In the above formula (4), a plurality of X each independently represent a halogen atom selected from the group consisting of a fluorine atom, a chlorine atom and a bromine atom; a plurality of $R^6$ each independently represent a hydrocarbon group having 1 to 10 carbon atoms, which may have a substituent; a represents an integer of 0 or 1; and n represents an integer of 0 to 2).

In a lithium salt (C) having a boron atom and represented by formula (4), X represents a halogen atom selected from the group consisting of a fluorine atom, a chlorine atom and a bromine atom and in particular, X preferably represents a fluorine atom. If X represents a fluorine atom, the chemical durability of a lithium salt in a lithium-ion secondary battery tends to be more improved.

A plurality of $R^6$ each independently represents a hydrocarbon group having 1 to 10 carbon atoms, which may have a substituent. Examples of the hydrocarbon group include, but are not particularly limited to, an aliphatic hydrocarbon group; an aromatic hydrocarbon group such as phenyl group; and a fluorine-substituted hydrocarbon group such as difluoromethylene group obtained by replacing hydrogen atoms with fluorine atoms. It should be noted that, the hydrocarbon group may have a functional group, if necessary. Examples of the functional group include, but are not particularly limited to, a halogen atom such as fluorine atom, a chlorine atom and a bromine atom, a nitrile group (—CN), an ether group (—O—), a carbonate group (—OCO$_2$—), an ester group (—CO$_2$—), a carbonyl group (—CO—), a sulfide group (—S—), a sulfoxide group (—SO—), a sulfone group (—SO$_2$—) and an urethane group (—NHCO$_2$—).

The number of carbon atoms of $R^6$ is 1 to 10, preferably 1 to 8 and more preferably 1 to 6. If the number of carbon atoms falls within the range, miscibility with a non-aqueous solvent tends to be more improved.

Preferable examples of $R^6$ include, but are not particularly limited to, an aliphatic hydrocarbon group such as methylene group, an ethylene group, a 1-methylethylene group, a propylene group, a butylene group, a 1,2-dimethylethylene group, a 1,2-di(trifluoromethyl)ethylene group and a fluoroethylene group; and an aromatic hydrocarbon group such as phenyl group, nitrile-substituted phenyl group and fluorinated phenyl group. Of them, a methylene group, an ethylene group, a 1-methylethylene group, a propylene group, a 1,2-dimethylethylene group, a 1,2-di(trifluoromethyl)ethylene group and a fluoroethylene group are more preferable. If $R^6$ is such hydrocarbon group, the ion conductivity of the lithium-ion secondary battery tends to be more improved.

In formula (4), a represents an integer of 0 or 1 and a more preferably represents 0. If a is 0, stability tends to be more improved. If a is 0, the structure on the right side in formula (4) becomes oxalic structure. In formula (4), n represents an integer of 0 to 2.

In view of chemical durability of a lithium-ion secondary battery, as a lithium salt (C) having a boron atom and represented by formula (4), compounds represented by the following formula (4-1) to formula (4-7) are preferable. Of these, a compound represented by formula (4-1), a compound represented by formula (4-2) and a compound represented by formula (4-3) are more preferable; and a compound represented by formula (4-1) and a compound represented by formula (4-2) are further preferable.

(4-1)

(4-2)

Li⁺ BF₄⁻ (4-3)

(4-4)

(4-5)

(4-6)

(4-7)

The content of the lithium salt (C) having a boron atom based on the electrolyte (100 mass %) is preferably 0.010 mass % or more and 10 mass % or less, more preferably 0.050 mass % or more and 5.0 mass % or less, further preferably 0.10 mass % or more and 5.0 mass % or less, further more preferably 0.20 mass % or more and 3.0 mass % or less, and still more preferably 0.40 mass % or more and 2.0 mass % or less. If the content of the lithium salt (C) having a boron atom is 0.010 mass % or more, the cycle life of the lithium-ion secondary battery tends to be more improved. In contrast, if the content of the lithium salt (C) having a boron atom is 10 mass % or less, the output power of the battery tends to be more improved. As described above, the lithium salt (C) having a boron atom can serve as an additive mainly for improving a cycle life. In view of this, even if the content thereof in an electrolyte is as small as 0.010 mass % or more and 10 mass % or less, the lithium salt (C) can produce a sufficient effect. The content of a lithium salt (C) having a boron atom in an electrolyte can be determined by NMR measurement such as $^{11}$B-NMR and $^{19}$F-NMR measurement. The content of a lithium salt (C) having a boron atom in the electrolyte of a lithium-ion secondary battery can be also determined similarly to the above, i.e., by NMR measurement such as $^{11}$B-NMR and $^{19}$F-NMR measurement.

When a lithium salt (C) having a boron atom and a lithium salt not having a boron atom are contained as the lithium salt (A), the content of the lithium salt (C) having a boron atom based on the total amount of lithium salt (A) is preferably 0.50 mass % or more and 50 mass % or less, more preferably 1.0 mass % or more and 40 mass % or less and further preferably 2.0 mass % or more and 30 mass % or less and further more preferably 5.0 mass % or more and 20 mass % or less. If the content of the lithium salt (C) having a boron atom based on the total amount of lithium salts serving as the lithium salt (A) is 0.50 mass % or more, the cycle life of the lithium-ion secondary battery tends to be more improved. In contrast, if the content of the lithium salt (C) having a boron atom based on the total amount of lithium salts serving as the lithium salt (A) is 50 mass % or less, the output power of the battery tends to be more improved. The content of the lithium salt (C) having a boron atom in the electrolyte of a lithium-ion secondary battery can be determined similarly to the above, i.e., by NMR measurement such as $^{11}$B-NMR and $^{19}$F-NMR measurement.

(Lithium Difluorophosphate and Lithium Monofluorophosphate)

As the lithium salt (A), at least one lithium salt selected from the group consisting of lithium difluorophosphate and lithium monofluorophosphate (hereinafter referred to also as a compound (F)) is preferably contained. If such lithium salt is contained, the cycle performance of the lithium-ion secondary battery tends to be more improved.

The each content of lithium difluorophosphate and lithium monofluorophosphate based on the electrolyte (100 mass %), is preferably 0.0010 mass % or more and 3.0 mass % or less, more preferably 0.0050 mass % or more and 2.0 mass % or less and further preferably 0.020 mass % or more and 1.0 mass % or less. If the each content of lithium difluorophosphate and lithium monofluorophosphate is 0.0010 mass % or more, the cycle life of the lithium-ion secondary battery tends to be more improved. In contrast, if the each content of lithium difluorophosphate and lithium monofluorophosphate is 3.0 mass % or less, the ion conductivity of the lithium-ion secondary battery tends to be more improved. The contents of lithium difluorophosphate and lithium monofluorophosphate in the electrolyte can be determined by NMR measurement such as $^{19}$F-NMR and $^{31}$P-NMR measurement. The contents of lithium difluorophosphate and lithium monofluorophosphate in the electrolyte of a lithium-ion secondary battery can be determined, similarly to the above, i.e., by NMR measurement such as $^{19}$F-NMR and $^{31}$P-NMR measurement.

When a compound (F) and a lithium salt other than the compound (F) are contained as the lithium salt (A), the content of the compound (F) based on the total amount of lithium salts serving as the lithium salt (A) is preferably 0.50 mass % or more and 50 mass % or less, more preferably 1.0 mass % or more and 40 mass % or less, further preferably 2.0 mass % or more and 30 mass % or less and further more preferably 5.0 mass % or more and 20 mass % or less. If the content of the compound (F) based on the total amount of lithium salts serving as the lithium salt (A) is 0.50 mass % or more, the cycle life of the lithium-ion secondary battery tends to be more improved. In contrast, if the content of a compound (F) based on the total amount of lithium salts serving as the lithium salt (A) is 50 mass % or less, the ion conductivity of the lithium-ion secondary battery tends to be more improved.

<Compound (B)>

The electrolyte according to the first embodiment contains at least one compound (B) selected from the group consisting of a compound represented by the following formula (1), a compound represented by the following formula (2) and a compound having a constitutional unit represented by the following formula (3a) and a constitutional unit represented by the following formula (3b).

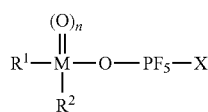
(1)

(In the above formula (1), X represents a Li atom or a hydrogen atom; M represents a P atom or a B atom, and when M represents a B atom, n represents an integer of 0 and when M represents a P atom, n represents an integer of 0 or 1; and $R^1$ and $R^2$ each independently represent a group selected from the group consisting of an OH group, an OLi group, an alkyl group having 1 to 10 carbon atoms, which may have a substituent, an alkoxy group having 1 to 10 carbon atoms, which may have a substituent, an aryl group having 6 to 10 carbon atoms, which may have a substituent, an aryloxy group having 6 to 10 carbon atoms, which may have a substituent, and an siloxy group having 3 to 10 carbon atoms.)

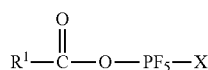
(2)

(In the above formula (2), X represents a Li atom or a hydrogen atom; and $R^3$ represents a hydrocarbon group having 1 to 20 carbon atoms, which may have a substituent.)

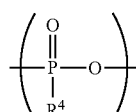
(3a)

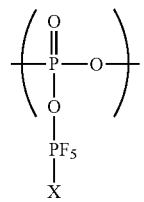
(3b)

(In the above formula (3a), $R^4$ represents a group selected from the group consisting of an OH group, an OLi group, an alkyl group having 1 to 10 carbon atoms, which may have a substituent, an alkoxy group having 1 to 10 carbon atoms, which may have a substituent, an aryl group having 6 to 10 carbon atoms, which may have a substituent, an aryloxy group having 6 to 10 carbon atoms, which may have a substituent, and an siloxy group having 3 to 10 carbon atoms; and, in the above formula (3b), X represents a Li atom or a hydrogen atom.)

Herein, the content of the compound (B) based on the electrolyte (100 mass %) is preferably 0.010 mass % or more and 10 mass % or less, more preferably 0.010 mass % or more and 5.0 mass % or less, further preferably 0.010 mass % or more and 5.0 mass % or less, further more preferably 0.050 mass % or more and 3.0 mass % or less, still further preferably 0.10 mass % or more and 3.0 mass % or less and particularly preferably 0.20 mass % or more and 3.0 mass % or less. If the content of the compound (B) is 0.010 mass % or more, the cycle life of the lithium-ion secondary battery tends to be more improved. In contrast, if the content of the compound (B) is 5.0 mass % or less, the input/output performance of the lithium-ion secondary battery tends to be more improved. The content of a compound (B) in the electrolyte can be determined by NMR measurement such as $^1$H-NMR, $^{13}$C-NMR, $^{11}$B-NMR, $^{19}$F-NMR and $^{31}$P-NMR measurement. The content of a compound (B) in the electrolyte of a lithium-ion secondary battery can be also determined similarly to the above, i.e., by NMR measurement such as $^1$H-NMR, $^{13}$C-NMR, $^{11}$B-NMR, $^{19}$F-NMR and $^{31}$P-NMR measurement.

It is sufficient that the compound (B) is contained in an electrolyte. The compound (B) may be added to the electrolyte during a preparation step thereof; or produced by a reaction taking place in an electrolyte.

(Compound (B) Represented by Formula (1))

In a compound (B) represented by formula (1), X represents a Li atom or a hydrogen atom. Of these, a Li atom is preferable. If X is a Li atom, battery capacity tends to be more improved. Furthermore, M represents a P atom or a B atom, and n represents 0 when M represents a B atom, and n represents an integer of 0 or 1 when M represents a P atom.

In a compound (B) represented by formula (1), $R^1$ and $R^2$ each independently represent a group selected from the group consisting of an OH group, an OLi group, an alkyl group having 1 to 10 carbon atoms, which may have a substituent, an alkoxy group having 1 to 10 carbon atoms, which may have a substituent, an aryl group having 6 to 10 carbon atoms, which may have a substituent, an aryloxy group having 6 to 10 carbon atoms, which may have a substituent, and an siloxy group having 3 to 10 carbon atoms.

The alkyl group having 1 to 10 carbon atoms, which may have a substituent, is not particularly limited, as long as it is a group having a structure in which a carbon atom directly binds to an M atom. Examples thereof include an aliphatic hydrocarbon group; and a fluorine-substituted hydrocarbon group, which is a hydrocarbon whose hydrogen atom is replaced with a fluorine atom, such as difluoromethylene group or trifluoromethyl group. It should be noted that, the alkyl group may have a functional group, if necessary. Examples of such functional group include, but are not particularly limited to, a halogen atom such as fluorine atom, a chlorine atom and a bromine atom; a nitrile group (—CN); an ether group (—O—); a carbonate group (—OCO$_2$—); an ester group (—CO$_2$—); a carbonyl group (—CO—), a sulfide group (—S—); a sulfoxide group (—SO—); a sulfone group (—SO$_2$—) and an urethane group (—NHCO$_2$—).

Preferable examples of the alkyl groups represented by $R^1$ and $R^2$ include, but are not particularly limited to, an aliphatic alkyl group such as methyl group, ethyl group, vinyl group, allyl group, propyl group, butyl group, pentyl group, hexyl group and fluorohexyl group. Of these, a methyl group, an ethyl group, an allyl group, a propyl group, a butyl group, a pentyl group, a hexyl group and a fluorohexyl group are more preferable. If such alkyl groups are used as $R^1$ and $R^2$, chemical stability tends to be more improved.

The number of carbon atoms of the alkyl group is 1 to 10, preferably 2 to 10 and more preferably 3 to 8. If the number of carbon atoms is 1 or more, the performance of the battery tends to be more improved. In contrast, if the number of carbon atoms is 10 or less, the affinity for the electrolyte tends to be more improved.

The alkoxy group having 1 to 10 carbon atoms, which may have a substituent, is not particularly limited as long as it is a group having a structure in which a carbon atom binds to an M atom via an oxygen atom. Examples thereof include an aliphatic hydrocarbonoxy group; and a fluorine-substituted hydrocarbonoxy group, which is an alkoxy group whose hydrogen atom is replaced with fluorine atom, such as trifluoroethyloxy group and hexafluoroisopropyloxy group. It should be noted that, the alkoxy group may have a functional group, if necessary. Examples of such functional group include, but are not particularly limited to, a halogen atom such as fluorine atom, chlorine atom and bromine atom; a nitrile group (—CN); an ether group (—O—); a carbonate group (—OCO$_2$—); an ester group (—CO$_2$—); a carbonyl group (—CO—); a sulfide group (—S—); a sulfoxide group (—SO—); a sulfone group (—SO$_2$—) and an urethane group (—NHCO$_2$—).

Preferable examples of the alkoxy groups represented by $R^1$ and $R^2$ include, but are not particularly limited to, an aliphatic alkoxy group such as methoxy group, ethoxy group, vinyloxy group, allyloxy group, propoxy group, butoxy group, cyanohydroxy group, fluoroethoxy group and fluoropropoxy group. Of these, a methoxy group, an ethoxy group, a vinyloxy group, an allyloxy group, a propoxy group, a butoxy group, a cyanohydroxy, a fluoroethoxy group and a fluoropropoxy group are more preferable. If such alkoxy groups are used as $R^1$ and $R^2$, chemical stability tends to be more improved.

The number of carbon atoms of the alkoxy group is 1 or more and 10 or less, preferably 1 or more and 8 or less and more preferably 2 or more and 8 or less. If the number of carbon atoms is 1 or more, the performance of the battery tends to be more improved. In contrast, if the number of carbon atoms is 10 or less, the affinity for an electrolyte tends to be more improved.

Examples of the aryl group having 6 to 10 carbon atoms, which may have a substituent, include, but are not particularly limited to, an aromatic hydrocarbon group such as phenyl group and benzyl group. It should be noted that, the aryl group may have a functional group, if necessary. Examples of the functional group include, but are not particularly limited to, a halogen atom such as fluorine atom, chlorine atom and bromine atom; a nitrile group (—CN); an ether group (—O—); a carbonate group (—OCO$_2$—); an ester group (—CO$_2$—); a carbonyl group (—CO—); a sulfide group (—S—); a sulfoxide group (—SO—); a sulfone group (—SO$_2$—) and an urethane group (—NHCO$_2$—).

Preferable examples of the aryl groups represented by $R^1$ and $R^2$ include, but are not particularly limited to, an aromatic alkyl group such as benzyl group, phenyl group, nitrile-substituted phenyl group, fluorinated phenyl group, nitrile-substituted benzyl group and fluorinated benzyl group. Of these, a benzyl group and a phenyl group are more preferable. If such aryl groups are used as $R^1$ and $R^2$, chemical stability tends to be more improved.

The number of carbon atoms of the aryl group is 6 to 10 and preferably 6 to 8. If the number of carbon atoms is 6 or more, the performance of the battery tends to be more improved. In contrast, if the number of carbon atoms is 10 or less, the affinity for an electrolyte tends to be more improved.

Examples of the aryloxy group having 6 to 10 carbon atoms, which may have a substituent, include, but are not particularly limited to, an aromatic hydrocarbonoxy group such as phenoxy group and benzylalkoxy group. It should be noted that, the aryloxy group may have a functional group, if necessary. Examples of the functional group include, but are not particularly limited to, a halogen atom such as fluorine atom, chlorine atom and bromine atom; a nitrile group (—CN); an ether group (—O—); a carbonate group (—OCO$_2$—); an ester group (—CO$_2$—); a carbonyl group (—CO—); a sulfide group (—S—); a sulfoxide group (—SO—); a sulfone group (—SO$_2$—) and an urethane group (—NHCO$_2$—).

Preferable examples of the aryloxy groups represented by $R^1$ and $R^2$ include, but are not particularly limited to, an aromatic alkoxy group such as phenoxy group, benzylalkoxy group, nitrile-substituted phenoxy group, fluorinated phenoxy group, nitrile-substituted benzylalkoxy group and fluorinated benzylalkoxy group. Of these, a phenoxy group and a benzylalkoxy group are more preferable. If such aryloxy groups are used as $R^1$ and $R^2$, chemical stability tends to be more improved.

The number of carbon atoms of the aryloxy group is 6 to 10 and preferably 6 to 8. If the number of carbon atoms is 6 or more, the performance of the battery tends to be more improved. In contrast, if the number of carbon atoms is 10 or less, the affinity for an electrolyte tends to be more improved.

The siloxy group having 3 to 10 carbon atoms is not particularly limited as long as it is a group having a structure in which a silicon atom binds to an M atom via an oxygen atom. For example, the siloxy group may contain a siloxane structure represented by Si—O—Si—.

In view of chemical stability, preferable examples of the siloxy include, but are not limited to, a trimethylsiloxy group, a triethylsiloxy group, a dimethylethylsiloxy group and a diethylmethylsiloxy group. Of these, a trimethylsiloxy group is more preferable.

The number of carbon atoms of the siloxy group is 3 or less and 10 or less, preferably 3 or more and 8 or less and more preferably 3 or more and 6 or less. If the number of carbon atoms of the siloxy group is 1 or more, the performance of the battery tends to be more improved. In contrast, if the number of carbon atoms of the siloxy group is 10 or less, chemical stability tends to be more improved.

The number of silicon atoms in the siloxy group, which is not particularly limited, is preferably 1 or more and 4 or less, more preferably 1 or more and 3 or less, further preferably 1 or more and 2 or less and further more preferably 1. If the number of silicon atoms of the siloxy group falls within the range, the chemical stability and performance of the battery tend to be more improved.

Of these, $R^1$ and $R^2$ each represent preferably an alkyl group having 1 to 10 carbon atoms, which may have a substituent, an alkoxy group having 1 to 10 carbon atoms, which may have a substituent, or an siloxy group having 3 to 10 carbon atoms. If $R^1$ and $R^2$ each represent such group, the solubility to an electrolyte tends to be more improved. At least one of $R^1$ and $R^2$ of a compound (A) is more preferably a functional group selected from the group consisting of an alkoxy group having 1 to 10 carbon atoms, which may have a substituent, and an siloxy group having 3 to 10 carbon atoms. If such group is present, the chemical stability and performance of the battery tends to be more improved.

As a compound (B) represented by formula (1), which is not particularly limited, a compound represented by formula (15) is preferable. If such compound is used, the lithium-ion secondary battery which can be operated at a high voltage and has a longer cycle life can be obtained.

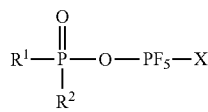

(15)

(In the above formula (15), X represents a Li atom or a hydrogen atom; $R^1$ and $R^2$ each independently represent a group selected from the group consisting of an OH group, an OLi group, an alkyl group having 1 to 10 carbon atoms, which may have a substituent, an alkoxy group having 1 to 10 carbon atoms, which may have a substituent, an aryl group having 6 to 10 carbon atoms, which may have a substituent, an aryloxy group having 6 to 10 carbon atoms, which may have a substituent, and an siloxy group having 3 to 10 carbon atoms.)

(Compound (B) Represented by Formula (2))

In a compound (B) represented by formula (2), X represents a Li atom or a hydrogen atom. Of these, a Li atom is preferable. If X is a Li atom, battery capacity tends to be more improved.

In a compound (B) represented by formula (2), $R^3$ represents a hydrocarbon group having 1 to 20 carbon atoms, which may have a substituent. Examples of the hydrocarbon group include, but are not particularly limited to, an aliphatic hydrocarbon group; an aromatic hydrocarbon group such as phenyl group; and a fluorine-substituted hydrocarbon group, which is a hydrocarbon group all of whose hydrogen atoms are replaced with fluorine atoms, such as trifluoromethyl group. The hydrocarbon group may have a functional group, if necessary. Examples of the functional group include, but are not particularly limited to, a halogen atom such as fluorine atom, a chlorine atom and a bromine atom; a nitrile group (—CN); an ether group (—O—); a carbonate group (—OCO₂—); an ester group (—CO₂—); a carbonyl group (—CO—); a sulfide group (—S—); a sulfoxide group (—SO—); a sulfone group (—SO₂—) and an urethane group (—NHCO₂—).

Furthermore, $R^3$ preferably has a structure(s) represented by the following formula (16) and/or the following formula (17). In this case, the basic skeleton of the compound (B) is a dicarboxylic acid derivative structure. If it has such structure, the performance of the battery tends to be more improved.

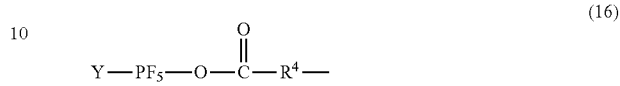

(16)

(In formula (16), Y represents a Li atom or a hydrogen atom; and $R^4$ represents a hydrocarbon group having 1 to 19 carbon atoms, which may have a substituent);

(17)

(In formula (17), $R^5$ represents a hydrocarbon group having 1 to 13 carbon atoms, which may have a substituent; and $R^6$ a hydrocarbon group having 1 to 6 carbon atoms, which may have a substituent or a trialkylsilyl group having 3 to 6 carbon atoms, which may have a substituent).

In formula (16), examples of $R^4$ include, but are not particularly limited to, a methylene group, an ethylene group, a propylene group and a butylene group. If $R^4$ is such functional group, the chemical stability of the compound (A) tends to be more improved.

In formula (17), examples of $R^5$ include, but are not particularly limited to, a methylene group, an ethylene group, a propylene group and a butylene group. If $R^5$ is such functional group, the chemical stability of the compound (A) tends to be more improved.

In formula (17), examples of $R^6$ include, but are not particularly limited to, a methyl group, an ethyl group, a vinyl group, an allyl group and a trimethylsilyl group. If $R^6$ is such functional group, the chemical stability of the compound (A) tends to be more improved.

The number of carbon atoms of $R^3$ is 1 to 20, preferably 1 or more and 16 or less, more preferably 1 or more and 14 or less. If the number of carbon atoms of $R^3$ falls within the above range, the solubility of the compound (B) tends to be more improved.

(Compound Having a Constitutional Unit Represented by Formula (3a) and a Constitutional Unit Represented by Formula (3b))

Examples of the compound having a constitutional unit represented by the following formula (3a) and a constitutional unit represented by the following formula (3b) include, but are not particularly limited to, a polymer of compounds represented by formula (1) where M is P.

In a compound having a constitutional unit represented by the following formula (3a) and a constitutional unit represented by the following formula (3b), X represents a Li atom or a hydrogen atom. Of these, a Li atom is preferable. If X is a Li atom, battery capacity tends to be more improved.

In a compound (B) having a constitutional unit represented by the following formula (3a) and a constitutional unit represented by the following formula (3b), $R^4$ represents a group selected from the group consisting of an OH group, an OLi group, an alkyl group having 1 to 10 carbon atoms, which may have a substituent, an alkoxy group having 1 to 10 carbon atoms, which may have a substituent, an aryl group having 6 to 10 carbon atoms, which may have a substituent, an aryloxy group having 6 to 10 carbon atoms, which may have a substituent, and an siloxy group having 3 to 10 carbon atoms.

Examples of the alkyl group having 1 to 10 carbon atoms, which may have a substituent, the alkoxy group having 1 to 10 carbon atoms, which may have a substituent, the aryl group having 6 to 10 carbon atoms, which may have a substituent, the aryloxy group having 6 to 10 carbon atoms, which may have a substituent and the siloxy group having 3 to 10 carbon atoms include, but are not particularly limited, the same groups as defined in formula (1) can be mentioned.

As the compound (B) having a constitutional unit represented by formula (3a) and a constitutional unit represented by formula (3b), which is not particularly limited, a compound represented by formula (18), a compound represented by formula (19) or a compound represented by formula (20) where at least one —OTMS group is substituted with a —O—PF$_5$Li group, are preferable. If such compound is used, the lithium-ion secondary battery which can be operated at a high voltage and having longer cycle life can be obtained.

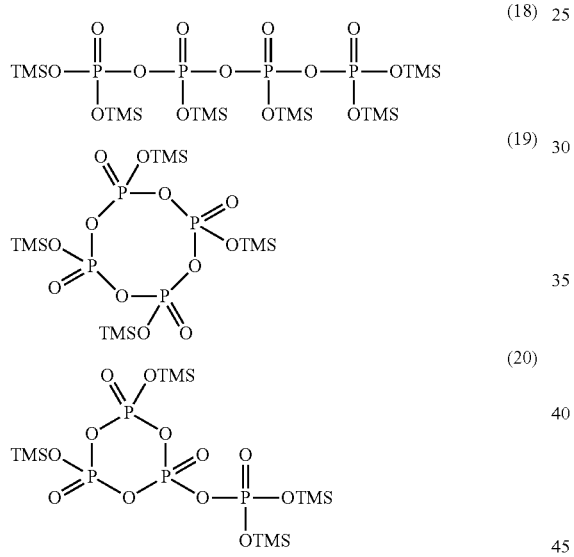

It should be noted that, the number of phosphoric-acid atoms present in a compound having a constitutional unit represented by formula (3a) and a constitutional unit represented by formula (3b), is preferably 2 to 16, more preferably 2 to 8 and further preferably 2 to 4. If the number of phosphoric-acid atoms falls within the above range, a lithium-ion secondary battery which can be operated at a high voltage and having a longer cycle life can be obtained.

Of them, a compound (B) is not particularly limited to; however, for example, a compound having a structure selected from the following structures is preferable. If such compound is used, a lithium-ion secondary battery which can be operated at a high voltage and having a longer cycle life can be obtained.

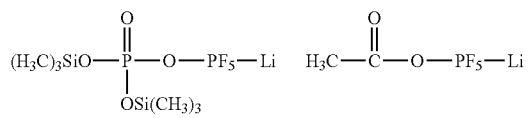

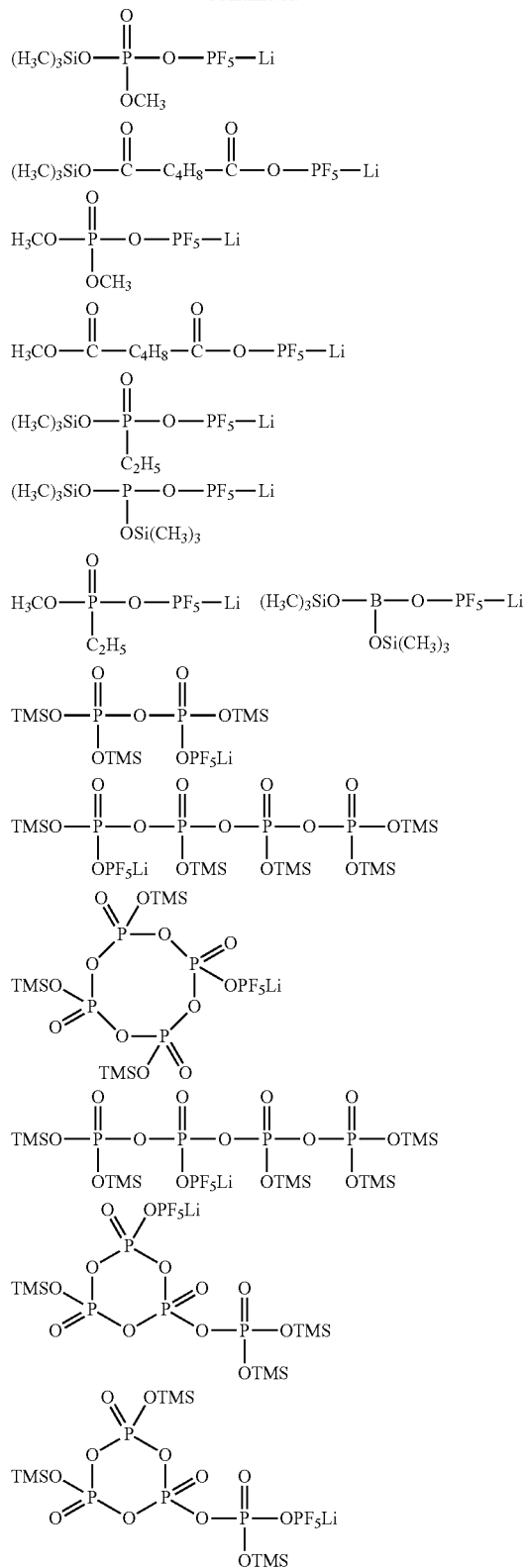

<Compound(s) (D) Having a Silicon Atom>

The electrolyte to be used in the first embodiment preferably contains a compound(s) (D) having a silicon atom represented by formula (10) and/or formula (11). If such compound(s) (D) having a silicon atom is contained, the cycle life tends to be more improved.

$$SiFR^1R^2R^3 \qquad (10)$$

(In the above formula (10), $R^1$, $R^2$ and $R^3$ each independently represent a hydrocarbon group having 1 to 10 carbon atoms, which may have a substituent.)

$$SiF_2R^4R^5 \qquad (11)$$

(In the above formula (11), $R^4$ and $R^5$ each independently represent a hydrocarbon group having 1 to 10 carbon atoms, which may have a substituent.)

The electrolyte according to the first embodiment contains a compound(s) (D) having a silicon atom and a lithium salt (C) having a boron atom as mentioned above, the cycle life of the lithium-ion secondary battery can be greatly improved. The reason for this is unknown; however, a lithium salt (C) having a boron atom and having the structure of formula (4) and a compound(s) (D) having a silicon atom presumably work on either one or both of a positive electrode and a negative electrode to suppress oxidative decomposition of the electrolyte in the lithium-ion secondary battery. The lithium salt (C) having a boron atom and having the structure of formula (4) not only serves as an electrolyte component responsible for ion conductivity but also serves as an additive mainly for producing an effect of improving a cycle life. Thus, even if the content of the lithium salt (C) in the electrolyte is as low as 0.01 mass % or more and 10 mass % or less, a sufficient effect can be produced.

The content of a compound(s) (D) having a silicon atom based on the electrolyte (100 mass %) is preferably 0.0010 mass % or more and 3.0 mass % or less, more preferably 0.0030 mass % or more and 2.0 mass % or less, further preferably 0.0050 mass % or more and 2.0 mass % or less, further more preferably 0.010 mass % or more and 1.0 mass % or less and particularly preferably 0.020 mass % or more and 2.0 mass % or less. If the content of a compound(s) (D) having a silicon atom is 0.0010 mass % or more, a lithium-ion secondary battery having a satisfactory cycle life can be obtained. In contrast, if the content of a compound(s) (D) having a silicon atom is 3.0 mass % or less, the lithium-ion secondary battery tends to be more suppressed from swelling. It is sufficient that the compound(s) (D) having a silicon atom is contained in an electrolyte; may be added to the electrolyte during a preparation step thereof; or may be produced by a reaction taking place in an electrolyte. The content of a compound(s) (D) having a silicon atom in an electrolyte can be determined by NMR measurement such as $^1$H-NMR and $^{19}$F-NMR measurement. The content of a compound(s) (D) having a silicon atom in the electrolyte of a lithium-ion secondary battery can be also determined similarly to the above, i.e., by NMR measurement such as $^1$H-NMR and $^{19}$F-NMR measurements.

In a compound (D) having a silicon atom represented by formula (10), $R^1$, $R^2$ and $R^3$ each independently represent a hydrocarbon group having 1 to 10 carbon atoms, which may have a substituent. Examples of such hydrocarbon group include, but are not particularly limited to, an aliphatic hydrocarbon group; an aromatic hydrocarbon group such as phenyl group; and fluorine-substituted hydrocarbon group all of whose hydrogen atoms are replaced with fluorine atoms, such as trifluoromethyl group. Furthermore, the hydrocarbon group may have a functional group, if necessary. Examples of such functional group include, but are not particularly limited to, a halogen atom such as fluorine atom, chlorine atom and bromine atom; a nitrile group (—CN); an ether group (—O—); a carbonate group (—OCO$_2$—); an ester group (—CO$_2$—); a carbonyl group (—CO—); a sulfide group (—S—); a sulfoxide group (—SO—); a sulfone group (—SO$_2$—) and an urethane group (—NHCO$_2$—).

Preferable examples of $R^1$, $R^2$ and $R^3$ include, but are not particularly limited to, an aliphatic hydrocarbon group such as methyl group, ethyl group, vinyl group, 1-methylvinyl group, propyl group, butyl group and fluoromethyl group; and an aromatic hydrocarbon group such as benzyl group, phenyl group, nitrile-substituted phenyl group and fluorinated phenyl group. Of them, a methyl group, an ethyl group, a vinyl group, a 1-methylvinyl group and a fluoromethyl group are more preferable. If $R^1$, $R^2$ and $R^3$ represent such hydrocarbon groups, chemical stability tends to be more improved.

The number of carbon atoms of hydrocarbon groups represented by $R^1$, $R^2$ and $R^3$ is 1 to 10, preferably 1 to 8 and more preferably 1 to 6. If the number of carbon atoms falls within the range, miscibility with a non-aqueous solvent tends to be more improved.

As the compound (D) having a silicon atom and represented by formula (10), which is not particularly limited, FSi(CH$_3$)$_3$, FSi(C$_2$H$_5$)$_3$, FSi(CHCH$_2$)$_3$, FSi(CH$_2$CHCH$_2$)$_3$ and FSi(CF$_3$)$_3$ are preferable and FSi(CH$_3$)$_3$ are more preferable. If a compound (D) having a silicon atom and represented by formula (10) is used, chemical durability in a lithium-ion secondary battery tends to be more improved.

In a compound (D) having a silicon atom and represented by formula (11), $R^4$ and $R^5$ each independently represent a hydrocarbon group having 1 to 10 carbon atoms, which may have a substituent. Examples of such hydrocarbon group include, but are not particularly limited to, an aliphatic hydrocarbon group; an aromatic hydrocarbon group such as phenyl group; and a fluorine-substituted hydrocarbon group all of whose hydrogen atoms are replaced with fluorine atoms, such as trifluoromethyl group. The hydrocarbon group may have a functional group, if necessary. Examples of the functional group include, but are not particularly limited to, a halogen atom such as fluorine atom, chlorine atom and bromine atom; a nitrile group (—CN); an ether group (—O—); a carbonate group (—OCO$_2$—); an ester group (—CO$_2$—); a carbonyl group (—CO—); a sulfide group (—S—); a sulfoxide group (—SO—); a sulfone group (—SO$_2$—) and an urethane group (—NHCO$_2$—).

Preferable examples of $R^4$ and $R^5$ include, but are not particularly limited to, an aliphatic hydrocarbon group such as methyl group, ethyl group, vinyl group, 1-methylvinyl group, propyl group, butyl group and fluoromethyl group; and an aromatic hydrocarbon group such as benzyl group, phenyl group, nitrile-substituted phenyl group and fluorinated phenyl group. Of these, a methyl group, an ethyl group, a vinyl group, a 1-methylvinyl group and a fluoromethyl group are more preferable. If $R^4$ and $R^5$ are such hydrocarbon groups, chemical stability tends to be more improved.

The number of carbon atoms of hydrocarbon groups represented by $R^4$ and $R^5$ is 1 to 10, preferably 1 to 8 and more preferably 1 to 6.

As the compound (D) having a silicon atom represented by formula (11), which is not particularly limited, F$_2$Si(CH$_3$)$_2$ is preferable. If such compound (D) having a silicon atom represented by formula (11) is used, chemical durability in a lithium-ion secondary battery tends to be more improved.

<Compound (E)>

The electrolyte according to the first embodiment preferably contains a compound (E) which is an acid selected from the group consisting of sulfonic acid, carboxylic acid, and protonic acid having a phosphorus atom and/or a boron atom wherein at least one hydrogen of the acid is replaced with a structure represented by the following formula (12). If such compound (E) is contained, the cycle performance of the lithium-ion secondary battery tends to be more improved.

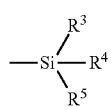

(12)

(In the above formula (12), $R^3$, $R^4$ and $R^5$ each independently represent an organic group having 1 to 10 carbon atoms, which may have a substituent.)

It should be noted that, if the electrolyte according to the first embodiment contains the above compound(s) (D) having a silicon atom and compound (E), cycle life tends to be more improved.

The protonic acid having a phosphorus atom is not particularly limited as long as it is a compound having a phosphorus atom and a hydrogen atom that can be dissociated as a proton. The protonic acid having a phosphorus atom may contain a halogen atom such as fluorine atom and chlorine atom; an organic group such as alkoxy group and alkyl group, and a hetero atom such as Si, B, O or N. A protonic acid having a phosphorus atom may contain a plurality of phosphorus atoms, like a polyphosphoric acid. As such protonic acid having a phosphorus atom, which is not particularly limited, phosphoric acid, phosphorous acid, pyrophosphoric acid, polyphosphoric acid and phosphonic acid are preferable. Of these, phosphoric acid, phosphorous acid and phosphonic acid are more preferable. If such compound (E) is used, stability tends to be more improved. These protonic acids may have a substituent.

The protonic acid having a boron atom is not particularly limited as long as it is a compound having a boron atom and a hydrogen atom that can be dissociated as a proton. The protonic acid having a boron atom may contain a halogen atom such as fluorine atom and chlorine atom; an organic group such as alkoxy group and alkyl group, and a hetero atom such as Si, P, O and N. A protonic acid having a boron atom may contain a plurality of boron atoms. As such protonic acid having a boron atom, which is not particularly limited, boric acid, boronic acid and borinic acid are preferable. These protonic acids may have a substituent.

The sulfonic acid is not particularly limited as long as it is a compound having a —$SO_3H$ group (sulfonate group) and may have a plurality of sulfonate groups. In the first embodiment, sulfonic acid includes sulfuric acid ($HOSO_3H$). As the sulfonic acid, which is not particularly limited, methylsulfonic acid, ethylsulfonic acid, propylsulfonic acid, 1,2 ethanedisulfonic acid, trifluoromethylsulfonic acid, phenylsulfonic acid, benzylsulfonic acid and sulfuric acid can be preferably used.

The carboxylic acid is not particularly limited as long as it is a compound having a $CO_2H$ group (carboxylic group) and may have a plurality of carboxylic groups. Examples of the carboxylic acid include, but are not particularly limited to, acetic acid, trifluoroacetic acid, propionic acid, butyric acid, valeric acid, acrylic acid, methacrylic acid, oleic acid, linoleic acid, linolenic acid, benzoic acid, phthalic acid, isophthalic acid, terephthalic acid, salicylic acid, malonic acid, fumaric acid, succinic acid, glutaric acid, adipic acid and itaconic acid. Of these, dicarboxylic acids such as benzoic acid, phthalic acid, isophthalic acid, terephthalic acid, salicylic acid, malonic acid, fumaric acid, succinic acid, glutaric acid, adipic acid and itaconic acid are preferable, and adipic acid, itaconic acid, succinic acid, isophthalic acid and terephthalic acid are more preferable.

The compound (E) is a compound which is an acid selected from the group consisting of sulfonic acid, carboxylic acid, and protonic acid having a phosphorus atom and/or a boron atom, wherein at least one hydrogen of the acid is replaced with a structure represented by the following formula (12). In the structure represented by formula (12), $R^3$, $R^4$ and $R^5$ each independently represent a hydrocarbon group having 1 to 10 carbon atoms, which may have a substituent.

Examples of hydrocarbon groups represented by $R^3$, $R^4$ and $R^5$ include, but are not particularly limited to, an aliphatic hydrocarbon group; an aromatic hydrocarbon group such as phenyl group; and a fluorine-substituted hydrocarbon group, which is a hydrocarbon group all of whose hydrogen atoms are replaced with fluorine atoms, such as trifluoromethyl group. It should be noted that, the hydrocarbon group may have a functional group, if necessary. Examples of such functional group include, but are not particularly limited to, halogen atoms such as fluorine atom, chlorine atom and bromine atom; a nitrile group (—CN); an ether group (—O—); a carbonate group (—$OCO_2$—); an ester group (—$CO_2$—); a carbonyl group (—CO—); a sulfide group (—S—); a sulfoxide group (—SO—); a sulfone group (—$SO_2$—) and an urethane group (—$NHCO_2$—).

Preferable examples of $R^3$, $R^4$ and $R^5$ include, but are not particularly limited to, an aliphatic hydrocarbon group such as methyl group, ethyl group, vinyl group, 1-methylvinyl group, propyl group, butyl group and fluoromethyl group; and an aromatic hydrocarbon group such as benzyl group, phenyl group, nitrile-substituted phenyl group and fluorinated phenyl group. Of them, in view of chemical stability, a methyl group, an ethyl group, a vinyl group, a 1-methylvinyl group and a fluoromethyl group are more preferable. Two Rs may join together to form a ring. In the case of forming a ring, for example, it may be a substituted or unsubstituted and saturated or unsaturated alkylene group.

The number of carbon atoms of each of $R^3$, $R^4$ and $R^5$ is 1 to 10, preferably 1 to 8 and more preferably 1 to 6. If the number of carbon atoms falls within the range, miscibility with a non-aqueous solvent tends to be more improved.

As the structure represented by formula (12), which is not particularly limited, —$Si(CH_3)_3$, —$Si(C_2H_5)_3$, —$Si(CHCH_2)_3$, —$Si(CH_2CHCH_2)_3$ and —$Si(CF_3)_3$ are preferable, and —$Si(CH_3)_3$ is more preferable. If it is such structure, chemical durability in a lithium-ion secondary battery tends to be more improved.

In the case where the acid selected from the group consisting of sulfonic acid, carboxylic acid and a protonic acid(s) having a phosphorus atom and/or a boron atom has a plurality of hydrogen atoms, it is sufficient that at least one of the hydrogen atoms is substituted with the structure represented by formula (12). The remaining unsubstituted hydrogen atoms may be present as they are or may be substituted with a functional group except the structure represented by formula (12). Preferable examples of such functional group include, but are not particularly limited to, a halogen substituted or unsubstituted and saturated or unsaturated hydrocarbon group having 1 to 20 carbon atoms. Examples of the halogen substituted or unsubstituted and saturated or unsaturated hydrocarbon group include, but are not particularly limited to, an alkyl group, an alkenyl group, an alkynyl group, an allyl group and a vinyl group. Furthermore, substituents for two hydrogen atoms may join together to form a ring. In the case of forming a ring, for example, it may be a substituted or unsubstituted and saturated or unsaturated alkylene group.

As the compound (E), which is not particularly limited, a compound(s) represented by the following formula (13) and/or the following formula (14) are preferable.

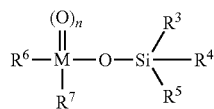
(13)

(In the above formula (13), M represents a phosphorus atom (hereinafter also referred to as a "P atom") or a boron atom (hereinafter also referred to as a "B atom"), n represents 0 or 1 when M represents a P atom and n represents 0 when M represents a B atom; $R^3$, $R^4$ and $R^5$ each independently represent an organic group having 1 to 10 carbon atoms, which may have a substituent; and $R^6$ and $R^7$ each independently represent a group selected from the group consisting of an OH group, an OLi group, an alkyl group having 1 to 10 carbon atoms, which may have a substituent, an alkoxy group having 1 to 10 carbon atoms, which may have a substituent, a siloxy group having 3 to 10 carbon atoms, an aryl group having 6 to 15 carbon atoms and an aryloxy group having 6 to 15 carbon atoms.)

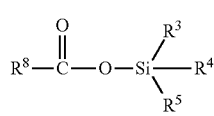
(14)

(In the above formula (14), $R^3$, $R^4$ and $R^5$ each independently represents an organic group having 1 to 10 carbon atoms, which may have a substituent; and $R^8$ represents an organic group an organic group having 1 to 20 carbon atoms, which may have a substituent.)

In a compound (E) represented by formula (13), M represents a P atom or a B atom, and when M represents a P atom, n represents an integer of 0 or 1 and when M represents a B atom, n represents an integer of 0. More specifically, in formula (13), when M represents a B atom and n is 0, the compound (E) has the structure of boric acid; when M represents a P atom and n is 0, the compound (E) has the structure of phosphorous acid; and when M represents a P atom and n is 1, the compound (E) has the structure of phosphoric acid. In view of the stability of the electrolyte containing a compound (E), the structure represented by the following formula (18) where M represents a P atom is more preferable.

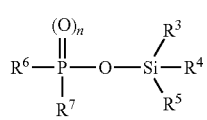
(18)

(In the above formula (18), $R^3$, $R^4$ and $R^5$ each independently represent an organic group having 1 to 10 carbon atoms, which may have a substituent; and $R^6$ and $R^7$ each independently represent a group selected from the group consisting of an OH group, an OLi group, an alkyl group having 1 to 10 carbon atoms, which may have a substituent, an alkoxy group having 1 to 10 carbon atoms, which may have a substituent, an siloxy group having 3 to 10 carbon atoms, an aryl group having 6 to 15 carbon atoms and an aryloxy group having 6 to 15 carbon atoms).

In compounds (E) represented by formulas (13) and (18), $R^6$ and $R^7$ each independently represent a group selected from the group consisting of an OH group, an OLi group, an alkyl group having 1 to 10 carbon atoms, which may have a substituent, an alkoxy group having 1 to 10 carbon atoms, which may have a substituent, an siloxy group having 3 to 10 carbon atoms, an aryl group having 6 to 15 carbon atoms and an aryloxy group having 6 to 15 carbon atoms.

The alkyl group having 1 to 10 carbon atoms, which may have a substituent, is a group having a structure in which a carbon atom is directly bound to an M atom. Examples of an alkyl group include, but are not particularly limited to, an aliphatic group and a fluorine-substituted hydrocarbon group, which is a hydrocarbon group at least a part of whose hydrogen atoms is replaced with fluorine atom, such as trifluoromethyl group. The alkyl group may have a substituent (various functional groups), if necessary. Examples of such functional group include, but are not particularly limited to, a halogen atom such as fluorine atom, chlorine atom and bromine atom; a nitrile group (—CN); an ether group (—O—); a carbonate group (—OCO$_2$—); an ester group (—CO$_2$—); a carbonyl group (—CO—); a sulfide group (—S—); a sulfoxide group (—SO—); a sulfone group (—SO$_2$—); an urethane group (—NHCO$_2$—); and an aromatic group such as phenyl group and benzyl group.

Preferable examples of the alkyl groups represented by $R^6$ and $R^7$ include, but are not particularly limited to, an aliphatic alkyl group such as methyl group, ethyl group, vinyl group, allyl group, propyl group, butyl group, pentyl group, hexyl group and fluorohexyl group. Of these, in view of chemical stability, a methyl group, an ethyl group, an allyl group, a propyl group, a butyl group, a pentyl group, a hexyl group and a fluorohexyl group are more preferable.

The number of carbon atoms of an alkyl group represented by each of $R^6$ and $R^7$ is 1 or more and 10 or less, preferably 2 or more and 10 or less and more preferably 3 or more and 8 or less. If the number of carbon atoms is 1 or more, the performance of the battery tends to be more improved. In contrast, if the number of carbon atoms is 10 or less, the affinity for an electrolyte tends to be more improved.

The alkoxy group having 1 to 10 carbon atoms, which may have a substituent, is a group having a structure in which a carbon atom is bound to an M atom via an oxygen atom. Examples of the alkoxy group include, but are not particularly limited to, an alkoxy group having an aliphatic group and a fluorine-substituted alkoxy group, which is an alkoxy group at least one of whose hydrogen is replaced with fluorine atom, such as trifluoroethyl group and hexafluoroisopropoxy group. The alkoxy group may have a substituent (various functional groups), if necessary. Examples of such functional groups include, but are not particularly limited to, a halogen atom such as fluorine atom, chlorine atom and bromine atom; a nitrile group (—CN); an ether group (—O—); a carbonate group (—OCO$_2$—); an ester group (—CO$_2$—); a carbonyl group (—CO—); a sulfide group (—S—); a sulfoxide group (—SO—); a sulfone group (—SO$_2$—); an urethane group (—NHCO$_2$—); and an aromatic group such as phenyl group and benzyl group.

Preferable examples of the alkoxy groups represented by $R^6$ and $R^7$ include, but are not particularly limited to, an aliphatic alkoxy group such as methoxy group, ethoxy group, vinyloxy group, allyloxy group, propoxy group, butoxy group, cyanohydroxy group, fluoroethoxy group and fluoropropoxy group. Of them, in view of chemical stability, a methoxy group, an ethoxy group, a vinyloxy group, an allyloxy group, a propoxy group, a butoxy group, a cyanohydroxy group, a fluoroethoxy group and a fluoropropoxy group are more preferable.

The number of carbon atoms of an alkoxy group represented by each of $R^6$ and $R^7$ is 1 to 10, preferably 1 or more and 8 or less and more preferably 2 or more and 8 or less. If the number of carbon atoms is 1 or more, the performance of the battery tends to be more improved. In contrast, if the number of carbon atoms is 10 or less, the affinity for an electrolyte tends to be more improved.

The siloxy group having 3 to 10 carbon atoms is a group having a structure in which a silicon atom is bound to an M atom via an oxygen atom. The siloxy group may contain a siloxane structure represented by Si—O—Si—. In view of chemical stability, preferable examples of the siloxy group include, but are not particularly limited to, a trimethylsiloxy group, a triethylsiloxy group, a dimethylethylsiloxy group and a diethylmethylsiloxy group. A trimethylsiloxy group is more preferable.

The number of carbon atoms of a siloxy group is 3 or more and 10 or less, preferably 3 or more and 8 or less and more preferably 3 or more and 6 or less. If the number of carbon atoms of a siloxy group is 3 or more, the performance of the battery tends to be more improved. In contrast, if the number of carbon atoms of a siloxy group is 10 or less, chemical stability tends to be more improved.

The number of silicon atoms in a siloxy group, which is not particularly limited, is preferably 1 or more and 4 or less, preferably 1 or more and 3 or less, more preferably 1 or more and 2 or less and further preferably 1. If the number of silicon atoms in a siloxy group falls within the range, chemical stability and the performance of the battery tend to be more improved.

The aryl group is a group having a structure in which a carbon atom of an aromatic ring is directly bound to an M atom. The aryl group may have a substituent (various functional groups), if necessary. Examples of such functional groups include, but are not particularly limited to, a halogen atom such as fluorine atom, chlorine atom and bromine atom; a nitrile group (—CN); an ether group (—O—); a carbonate group (—OCO$_2$—); an ester group (—CO$_2$—); a carbonyl group (—CO—); a sulfide group (—S—); a sulfoxide group (—SO—); a sulfone group (—SO$_2$—); an urethane group (—NHCO$_2$—); an alkyl group and an alkoxy group.

Preferable examples of the aryl group include, but are not particularly limited to, an aromatic alkyl group such as benzyl group, phenyl group, nitrile-substituted phenyl group and fluorinated phenyl group.

The number of carbon atoms of the aryl group is 6 or more and 15 or less and preferably 6 or more and 12 or less. If the number of carbon atoms of the aryl group is 6 or more, the chemical stability of the compound tends to be more improved. In contrast, if the number of carbon atoms of the aryl group is 15 or less, the performance of the battery tends to be more improved.

The aryloxy group is a group having a structure in which an aryl group is bound to an M atom via oxygen. The aryloxy group may have a substituent (various functional groups), if necessary. Examples of such functional group include, but are not particularly limited to, a halogen atom such as fluorine atom, chlorine atom and bromine atom; a nitrile group (—CN); an ether group (—O—); a carbonate group (—OCO$_2$—); an ester group (—CO$_2$—); a carbonyl group (—CO—); a sulfide group (—S—); a sulfoxide group (—SO—); a sulfone group (—SO$_2$—); an urethane group (—NHCO$_2$—); an alkyl group and an alkoxy group.

Preferable examples of the aryloxy group include, but are not particularly limited to, an aromatic alkoxy group such as phenoxy group, benzylalkoxy group, nitrile-substituted phenoxy group and fluorinated phenoxy group.

The number of carbon atoms of an aryloxy group is 6 or more and 15 or less, and preferably 6 or more and 12 or less. If the number of carbon atoms of the aryloxy group is 6 or more, the chemical stability of the compound tends to be more improved. In contrast, if the number of carbon atoms of the aryloxy group is 15 or less, the performance of the battery tends to be more improved.

Preferable examples of $R^6$ and $R^7$ include, but are not particularly limited to, an alkyl group having 1 to 10 carbon atoms, which may have a substituent, an alkoxy group having 1 to 10 carbon atoms, which may have a substituent and a siloxy group having 3 to 10 carbon atoms. Furthermore, at least one of $R^6$ and $R^7$ is more preferably a functional group selected from the group consisting of an alkoxy group having 1 to 10 carbon atoms, which may have a substituent and a siloxy group having 3 to 10 carbon atoms. If $R^6$ and $R^7$ represent such groups, the solubility to an electrolyte tends to be more improved.

In the compounds (E) represented by formulas (13) and (18), $R^3$, $R^4$ and $R^5$ each independently represent a hydrocarbon group having 1 to 10 carbon atoms. The preferable structures of $R^3$, $R^4$ and $R^5$ are the same as those of $R^3$, $R^4$ and $R^5$ shown in the above mentioned structure represented by formula (14).

In the compound (E) represented by formula (14), $R^8$ represents a hydrocarbon group having 1 to 20 carbon atoms, which may have a substituent. Examples of the hydrocarbon group represented by $R^8$ include, but are not particularly limited to, an aliphatic hydrocarbon group, an aromatic hydrocarbon group such as phenyl group, and a fluorine-substituted hydrocarbon group, which is a hydrocarbon group all of whose hydrogens are replaced with fluorine atoms, such as trifluoromethyl group. Furthermore, the hydrocarbon group may have a substituent (various functional groups), if necessary. Examples of such functional group include, but are not particularly limited to, a halogen atom such as fluorine atom, chlorine atom and bromine atom; a nitrile group (—CN); an ether group (—O—); a carbonate group (—OCO$_2$—); an ester group (—CO$_2$—); a carbonyl group (—CO—); a sulfide group (—S—); a sulfoxide group (—SO—); a sulfone group (—SO$_2$—) and an urethane group (—NHCO$_2$—).

The number of carbon atoms of the hydrocarbon group represented by $R^8$ herein is 1 or more and 20 or less, preferably 1 or more and 16 or less and more preferably 1 or more and 14 or less.

Preferable examples of the hydrocarbon group represented by $R^8$ include, but are not particularly limited to, a structure as shown in the following formula (19). In this case, the basic skeleton of the compound (E) is a dicarboxylic acid derivative structure.

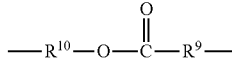

(19)

(In the above formula (19), $R^9$ represents a hydrocarbon group having 1 to 13 carbon atoms, which may have a substituent; $R^{10}$ represents a hydrocarbon group having 1 to 6 carbon atoms, which may have a substituent, or a trialkylsilyl group having 3 to 6 carbon atoms, which may have a substituent.)

In formula (19), preferable examples of $R^9$ include, in view of chemical stability of a compound (E), a methylene group, an ethylene group, a propylene group, a butylene group, a phenyl group, a fluoromethylene group, a fluoroethylene group, a fluoropropylene group and a fluorobutylene group.

In formula (19), preferable examples of $R^{10}$ include, in view of chemical stability of a compound (E), preferably, a methyl group, an ethyl group, a vinyl group, an allyl group, and a trialkylsilyl group such as trimethylsilyl group and triethylsilyl group. A trialkylsilyl group such as trimethylsilyl group and triethylsilyl group are more preferred. In particular, if $R^{10}$ represents a trialkylsilyl group, the compound (E) has a structure represented by the following formula (20).

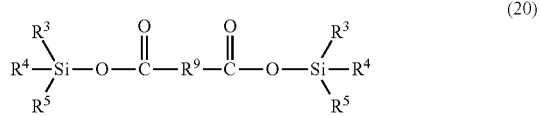

(20)

(In the above formula (20), $R^3$, $R^4$ and $R^5$ each independently represents an organic group having 1 to 10 carbon atoms; and $R^9$ represents a hydrocarbon group having 1 to 13 carbon atom, which may have a substituent.)

Preferable examples of the compound (E) include, but are not particularly limited to, tris(trimethylsilyl) phosphate, tris(trimethylsilyl) phosphite, tris(triethylsilyl) phosphate, tetrakis(trimethylsilyl) pyrophosphate, trimethylsilyl polyphosphate, di(trimethylsilyl) butylphosphonate, di(trimethylsilyl) propylphosphonate, di(trimethylsilyl) ethylphosphonate, di(trimethylsilyl) methylphosphonate, monomethyldi(trimethylsilyl) phosphate, monoethyldi(trimethylsilyl) phosphate, mono(trifluoroethyl)di(trimethylsilyl) phosphate, mono(hexafluoroisopropyl)di(trimethylsilyl) phosphate, tris(trimethylsilyl) borate, di(trimethylsilyl) sulfate, trimethylsilyl acetate, di(trimethylsilyl) oxalate, di(trimethylsilyl) malonate, di(trimethylsilyl) succinate, di(trimethylsilyl) itaconate, di(trimethylsilyl) adipate, di(trimethylsilyl) phthalate, di(trimethylsilyl) isophthalate and di(trimethylsilyl) terephthalate. Of these, in view of cycle life and suppression of gas generation, tris(trimethylsilyl) phosphate, tris(trimethylsilyl) phosphite, tetrakis(trimethylsilyl) pyrophosphate, trimethylsilyl polyphosphate, di(trimethylsilyl) butylphosphonate, di(trimethylsilyl) propylphosphonate, di(trimethylsilyl) ethylphosphonate, di(trimethylsilyl) methylphosphonate, monomethyldi(trimethylsilyl) phosphate, monoethyldi(trimethylsilyl) phosphate, mono(trifluoroethyl)di(trimethylsilyl) phosphate, mono(hexafluoroisopropyl)di(trimethylsilyl) phosphate, di(trimethylsilyl) succinate, di(trimethylsilyl) itaconate and di(trimethylsilyl) adipate are more preferable.

The content of the compound (E) based on the electrolyte (100 mass %) is preferably 0.010 mass % or more and 10 mass % or less, more preferably 0.020 mass % or more and 10 mass % or less, further preferably 0.050 mass % or more and 8.0 mass % or less, further more preferably 0.10 mass % or more and 5.0 mass % or less and still further preferably 0.20 mass % or more and 4.0 mass % or less. If the content of the compound (E) is 0.010 mass % or more, the cycle life of the lithium-ion secondary battery tends to be more improved. In contrast, if the content of the compound (E) is 10 mass % or less, the output power of the battery tends to be more improved. The content of the compound (E) in the electrolyte can be determined by NMR measurement. The content of the compounds (E) in the electrolyte of a lithium-ion secondary battery can be also determined by NMR measurement, similarly to the above.

<Other Additives>

The electrolyte according to the first embodiment can contain additives other than those mentioned above, if necessary. Examples of such additives include, but are not particularly limited to, vinylene carbonate, fluoroethylene carbonate, ethylene sulfite, propane sultone and succinonitrile. If such additives are contained, the cycle characteristics of the lithium-ion secondary battery tend to be more improved.

The electrolyte according to the first embodiment can be preferably used as an electrolyte for a non-aqueous electricity storage device. The "non-aqueous electricity storage device" herein refers to an electricity storage device using no aqueous solution as the electrolyte. Examples thereof include a lithium-ion secondary battery, a sodium-ion secondary battery, a calcium-ion secondary battery and a lithium-ion capacitor. Of these non-aqueous electricity storage devices, in view of practical use and durability, a lithium-ion secondary battery and a lithium-ion capacitor are preferable, and a lithium-ion secondary battery is more preferable.

Second Embodiment: Lithium-Ion Secondary Battery

The lithium-ion secondary battery according to the second embodiment (hereinafter simply referred to as the "battery") has an electrolyte as mentioned above, a positive electrode containing a positive-electrode active material and a negative electrode containing a negative-electrode active material. The battery may have the same structure as in conventional lithium-ion secondary batteries as long as it has the aforementioned electrolyte.

<Positive Electrode>

The positive electrode is not particularly limited as long as it serves as the positive electrode of a lithium-ion secondary battery and a known positive electrode can be used. The positive electrode preferably contains at least one selected from the group consisting of materials capable of absorbing and desorbing lithium ions, as a positive-electrode active material.

(Positive Electrode Active Material)

The battery of the second embodiment, in order to realize a higher voltage, preferably has a positive electrode containing a positive-electrode active material having a discharge capacity of 10 mAh/g or more at a potential of 4.4 V (vsLi/Li$^+$) or more. Even if such positive electrode is used, the battery of the second embodiment can be operated at a high voltage and have an improved recycle life, so it is useful. Herein, the positive-electrode active material having a discharge capacity of 10 mAh/g or more at a potential of 4.4 V (vsLi/Li$^+$) or more refers to a positive-electrode active material capable of carrying out a charge and discharge reaction at a potential of 4.4 V (vsLi/Li$^+$) or more, as a positive electrode of a lithium-ion secondary battery and having a discharge capacity of 10 mAh or more per mass (1 g) of the active material at a constant current discharge of 0.1 C. In short, the positive-electrode active material is sufficient if it has a discharge capacity of 10 mAh/g or more at a potential of 4.4 V (vsLi/Li$^+$) or more, and it may have a discharge capacity at a potential of 4.4 V (vsLi/Li$^+$) or less.

The discharge capacity of the positive-electrode active material to be used in the second embodiment is preferably 10 mAh/g or more at a potential of 4.4 V (vsLi/Li$^+$) or more, more preferably 15 mAh/g or more and further preferably 20 mAh/g or more. If the discharge capacity of the positive-electrode active material falls within the range, high energy density tends to be attained by operating at a high voltage. The upper limit of the discharge capacity of the positive-electrode active material at a potential of 4.4 V (vsLi/Li$^+$) or more, which is not particularly limited, is preferably 400 mAh/g or less. It should be noted that, the discharge capacity of the positive-electrode active material can be measured by the method described in Examples.

The positive-electrode active materials having a discharge capacity of 10 mAh/g or more at a potential of 4.4 V (vsLi/Li$^+$) or more can be used singly or in combination of two or more. Alternatively, as the positive-electrode active material, the positive-electrode active material having a discharge capacity of 10 mAh/g or more at a potential of 4.4 V (vsLi/Li$^+$) or more and a positive-electrode active material not having a discharge capacity of 10 mAh/g or more at a potential of 4.4 V (vsLi/Li$^+$) or more may be used in combination. Examples of the positive-electrode active material not having a discharge capacity of 10 mAh/g or more at a potential of 4.4 V (vsLi/Li$^+$) or more include, but are not particularly limited, LiFePO$_4$.

Such positive-electrode active material, which is not particularly limited, is preferably at least one selected from the group consisting of an oxide represented by formula (5), an oxide represented by formula (6), a composite oxide represented by formula (7), a compound represented by formula (8) and a compound represented by formula (9). If such positive-electrode active material is used, the structure stability of the positive-electrode active material tends to be more improved.

$$LiMn_{2-x}Ma_xO_4 \quad (5)$$

(In the above formula (5), Ma represents at least one selected from the group consisting of transition metals and x satisfies 0.2≤x≤0.7.)

$$LiMn_{1-u}Me_uO_2 \quad (6)$$

(In the above formula (6), Me represents at least one selected from the group consisting of transition metals excluding Mn and u satisfies 0.1≤u≤0.9.)

$$zLi_2McO_3\text{-}(1-z)LiMdO_2 \quad (7)$$

(In the above formula (7), Mc and Md each independently represent at least one selected from the group consisting of transition metals and z satisfies 0.1≤z≤0.9.)

$$LiMb_{1-y}Fe_yPO_4 \quad (8)$$

(In the above formula (8), Mb represents at least one selected from the group consisting of Mn and Co and y satisfies 0≤y≤0.9.)

$$Li_2MfPO_4F \quad (9)$$

(In the above formula (9), Mf represents at least one selected from the group consisting of transition metals.)

Examples of the oxide represented by formula (5) include, but are not particularly limited to, a spinel-type oxide and an oxide represented by formula (5a) or formula (5b) is more preferable.

$$LiMn_{2-x}Ni_xO_4 \quad (5a)$$

(In the above formula (5a), x satisfies the relationship of 0.2≤x≤0.7.)

$$LiMn_{2-x}Ni_xO_4 \quad (5b)$$

(In the above formula (5b), x satisfies the relationship of 0.3≤x≤0.6.)

Examples of the oxide represented by the above formula (5a) or the above formula (5b) include, but are not particularly limited to, LiMn$_{1.5}$Ni$_{0.5}$O$_4$ and LiMn$_{1.6}$Ni$_{0.4}$O$_4$. If such spinel-type oxide represented by formula (5) is used, stability tends to be more improved.

Herein, the oxide represented by the above formula (5), in view of e.g., the stability and electron conductivity of the positive-electrode active material, may further contain a transition metal or a transition metal oxide within the range of 10 mol % or less based on the molar number of Mn atoms, other than the above structure. The compounds represented by the above formula (5) can be used singly or in combination of two or more.

The oxide represented by the above formula (6), which is not particularly limited, is preferably a lamellar oxide and more preferably an oxide represented by the following formula (6a).

$$LiMn_{1-v-w}Co_vNi_wO_2 \quad (6a)$$

(In the above formula (6a), 0.1≤v≤0.4, 0.1≤w≤0.8.)

Examples of the lamellar oxide represented by the above formula (6a) include, but are not particularly limited to, LiMn$_{1/3}$Co$_{1/3}$Ni$_{1/3}$O$_2$, LiMn$_{0.1}$Co$_{0.1}$Ni$_{0.8}$O$_2$ and LiMn$_{0.3}$Co$_{0.2}$Ni$_{0.5}$O$_2$. If such compound represented by the above formula (6) is used, stability tends to be more improved. The compounds represented by formula (6) can be used singly or in combination of two or more.

The composite oxide represented by formula (7), which is not particularly limited, is preferably a lamellar complex oxide and more preferably a composite oxide represented by the following formula (7a).

$$zLi_2MnO_3\text{-}(1-z)LiNi_aMn_bCo_cO_2 \quad (7a)$$

(In the above formula (7a), z satisfies the relationship of 0.3≤z≤0.7, a, b and c satisfy the relationship of a+b+c=1, 0.2≤a≤0.6, 0.2≤b≤0.6, 0.05≤c≤0.4.)

Of these, a composite oxide represented by the above formula (7a) where 0.4≤z≤0.6, a+b+c=1, 0.3≤a≤0.4, 0.3≤b≤0.4, 0.2≤c≤0.3, is more preferable. If such composite oxide represented by formula (7) is used, stability tends to be more improved. The oxides represented by formula (7) can be used singly or in combination of two or more.

As the compound represented by formula (8), which is not particularly limited, an olivine-type compound is preferable and compounds represented by the following formula (8a) and the following formula (8b) are more preferable.

$$LiMn_{1-y}Fe_yPO_4 \quad (8a)$$

(In the above formula (8a), y satisfies 0.05≤y≤0.8.)

$$LiCo_{1-y}Fe_yPO_4 \quad (8b)$$

(In the above formula (8b), y satisfies 0.05≤y≤0.8.)

If such compound represented by formula (8) is used, the stability and electron conductivity tend to be more improved. The compounds represented by formula (8) can be used singly or in combination of two or more.

As a compound represented by the above formula (9), i.e., an olivine-type fluoride positive-electrode active material, which is not particularly limited, Li$_2$FePO$_4$F, Li$_2$MnPO$_4$F and Li$_2$CoPO$_4$F are preferable. If such compound represented by formula (9) is used, stability tends to be more improved. The compounds represented by formula (9) can be used singly or in combination of two or more.

(Positive-Electrode Potential in Terms of Lithium Standard at the Time of Full Charge)

The positive-electrode potential in terms of lithium standard of the lithium-ion secondary battery according to the second embodiment at the time of full charge is preferably 4.4 V (vsLi/Li$^+$) or more, more preferably 4.45 V (vsLi/Li$^+$) or more and further preferably 4.5 V (vsLi/Li$^+$) or more. If the positive-electrode potential at the time of full charge is 4.4 V (vsLi/Li$^+$) or more, the charge-discharge capacity of the positive-electrode active material contained in the lithium-ion secondary battery tends to be efficiently used. In addition, if the positive-electrode potential at the time of full charge is 4.4 V (vsLi/Li$^+$) or more, the energy density of the lithium-ion secondary battery tends to be more improved. It should be noted that, the positive-electrode potential in terms of lithium standard at the time of full charge can be controlled by controlling the voltage of the battery at the time of full charge. The upper limit of the positive-electrode potential at the time of full charge, which is not particularly limited; is preferably 5.2 V (vsLi/Li$^+$) or less.

The positive-electrode potential in terms of lithium standard at the time of full charge can be easily measured by decomposing a fully charged lithium-ion secondary battery in an Ar glove box, taking out the positive electrode, reassembling a battery using a metal lithium as a counter electrode and measuring the voltage. Alternatively, when a carbon negative-electrode active material is used in the negative electrode, since the potential of the carbon negative-electrode active material at the time of full charge is 0.05 V (vsLi/Li$^+$), the potential of the positive electrode at the time of full charge can be easily obtained by adding 0.05 V to the voltage (Va) of the lithium-ion secondary battery at the time of full charge. For example, assuming that, in a lithium-ion secondary battery employing a carbon negative-electrode active material in the negative electrode, the voltage (Va) of the lithium-ion secondary battery at the time of full charge is 4.4 V, the potential of the positive electrode at the time of full charge can be obtained in accordance with the expression: 4.4 V+0.05 V=4.45 V.

It should be noted that, in conventional lithium-ion secondary batteries, the potential of the positive electrode at the time of full charge is usually set at a voltage in the range from 4.2 V (vsLi/Li$^+$) to 4.3 V (vsLi/Li+) or less. In this way, a lithium-ion secondary battery having a potential of the positive electrode at the time of full charge of 4.4 V (vsLi/Li$^+$) or more has a high voltage compared to conventional lithium-ion secondary batteries. In the second embodiment, the "high-voltage lithium-ion secondary battery" refers to a lithium-ion secondary battery having a positive electrode, which has a positive-electrode active material having a discharge capacity of 10 mAh/g or more at a potential of 4.4 V (vsLi/Li$^+$) or more, and is used at a positive-electrode potential at the time of full charge of 4.4 V (vsLi/Li$^+$) or more. When such high-voltage lithium-ion secondary battery is used, a carbonate-based solvent contained in the electrolyte is oxidatively decomposed on the surface of the positive electrode, reducing the cycle life of the battery. Such problem is rarely produced in conventional lithium-ion secondary batteries, which are used at a positive-electrode potential at the time of full charge of less than 4.4 V (vsLi/Li$^+$). The lithium-ion secondary battery according to the second embodiment having the aforementioned constitutions can overcome such problem caused at a positive-electrode potential at the time of full charge of 4.4 V (vsLi/Li$^+$) or more, and thus can be operated at a high voltage and acquires a long cycle life. It should be noted that, the expression, (vsLi/Li$^+$), represents the potential in terms of lithium standard.

(Method for Producing the Positive-Electrode Active Material)

The positive-electrode active material can be produced in the same manner as in a common method for producing an inorganic oxide. Examples of the method for producing the positive-electrode active material include, but are not particularly limited to, a method of calcining a mixture containing metal salts (for example, sulfate and/or nitrate) in a predetermined ratio, in an ambient atmosphere containing oxygen; and a method of reacting a carbonate and/or a hydroxide with a solution dissolving a metal salt to precipitate a less-soluble metal salt, separating the metal salt by extraction, adding lithium carbonate and/or lithium hydroxide as a lithium source to the metal salt, and calcining the mixture in an ambient atmosphere containing oxygen.

(Method for Forming Positive Electrode)

Herein, a method for forming a positive electrode will be described below. First, to the above positive-electrode active material, a conductive aid and a binder etc. are added, if necessary, and mixed to prepare a positive electrode mixture. Then, the positive electrode mixture is dispersed in a solvent to prepare a paste containing the positive electrode mixture. Subsequently, the paste is applied to a positive electrode current collector and dried to form a layer of the positive electrode mixture. The thickness of the layer is controlled, if necessary, by applying pressure to form a positive electrode.

Examples of the positive electrode current collector include, but are not particularly limited to, a positive electrode current collector formed of a metal foil such as aluminum foil or stainless foil.

<Negative Electrode>

The lithium-ion secondary battery of the second embodiment has a negative electrode. The negative electrode is not particularly limited as long as it can serve as a negative electrode of a lithium-ion secondary battery and a known negative electrode can be used. The negative electrode preferably contains at least one selected from the group consisting of negative-electrode active materials capable of absorbing and desorbing lithium ions. Examples of such negative-electrode active material include, but are not particularly limited to, at least one selected from the group consisting of negative-electrode active materials containing an element capable of forming an alloy with lithium, such as carbon negative-electrode active material, silicon alloy negative-electrode active material and tin alloy negative-electrode active material; silicon oxide negative-electrode active materials; tin oxide negative-electrode active materials; and lithium-containing compounds such as lithium titanate negative-electrode active material. These negative-electrode active materials can be used singly or in combination of two or more.

Examples of the carbon negative-electrode active material include, but are not particularly limited to, hard carbon, soft carbon, artificial graphite, natural graphite, graphite, pyrolytic carbon, coke, glassy carbon, a calcined organic polymer compound, meso-carbon microbeads, a carbon fiber, activated carbon, graphite, carbon colloid and carbon black. Examples of the coke include, but are not particularly limited to, pitch coke, needle coke and petroleum coke. Examples of the calcined organic polymer compound include, but are not particularly limited to, a carbonate obtained by calcining a polymer material such as phenol resin or furan resin at an appropriate temperature.

Examples of the negative-electrode active material containing an element capable of forming an alloy with lithium include, but are not particularly limited to, a simple metal or metalloid, an alloy, a compound, and a material at least having a phase formed of at least one of these. It should be noted that, "alloy" includes not only an alloy formed of two or more metal elements but also an alloy having at least one metal element and at least one metalloid. The alloy may contain a nonmetallic element as long as it has a nature of a metal as a whole.

Examples of the metal element and metalloid element include, but are not particularly limited to, titanium (Ti), tin (Sn), lead (Pb), aluminum (Al), indium (In), silicon (Si), zinc (Zn), antimony (Sb), bismuth (Bi), gallium (Ga), germanium (Ge), arsenic (As), silver (Ag), hafnium (Hf), zirconium (Zr) and yttrium (Y). Of them, metal elements and metalloid elements belonging to the 4th family or 14th-family in the long-form periodic table are preferable and titanium, silicon and tin are particularly preferable.

(Method for Forming Negative Electrode)

The negative electrode can be obtained by the following manner. First, to the above negative-electrode active material, a conductive aid and a binder etc. are added, if necessary, and mixed to prepare a negative electrode mixture. Then, the negative electrode mixture is dispersed in a solvent to prepare a paste containing the negative electrode mixture. Subsequently, the paste is applied to a negative electrode current collector and dried to form a layer of the negative electrode mixture. The thickness of the layer is controlled, if necessary, by applying pressure to form a negative electrode.

Examples of the negative electrode current collector include, but are not particularly limited, a negative electrode current collector formed of a metal foil such as copper foil, nickel foil or stainless steel foil.

Examples of the conductive aid to be optionally used in forming a positive electrode and a negative electrode include, but are not particularly limited to, graphite, carbon black such as acetylene black and Ketjen black, and a carbon fiber.

Examples of the binder to be optionally used in forming a positive electrode and a negative electrode include, but are not particularly limited to, polyvinylidene fluoride (PVDF), polytetrafluoroethylene (PTFE), polyacrylic acid, styrene-butadiene rubber and fluorine rubber.

<Separator>

The lithium-ion secondary battery according to the second embodiment preferably has a separator between a positive electrode and a negative electrode in order to prevent short-circuiting of the positive and negative electrodes and to ensure safety by e.g., shut down. As the separator, which is not particularly limited, the same separator as used in a known lithium-ion secondary battery can be used. In particular, an insulating thin-film having a large ion permeability and excellent mechanical strength is preferable.

Examples of the separator include, but are not particularly limited to, woven fabric, non-woven fabric and a microporous film made of a synthetic resin. Of them, a microporous film made of a synthetic resin is preferable. Examples of the nonwoven fabric include, but are not particularly limited to, a porous film formed of a ceramic, polyolefin, polyester, polyamide, liquid crystal polyester and or a heat-resistant resin such as aramid. Examples of the microporous film made of a synthetic resin include, but are not particularly limited to, a microporous film containing a polyethylene or a polypropylene as a main component; and a polyolefin microporous film containing both of these polyolefins. The separator may be a single layer formed of a single microporous film or a laminate formed of a plurality of single-type microporous films, or a laminate formed of two or more types of microporous films.

The lithium-ion secondary battery according to the second embodiment, which is not particularly limited, has, for example, a separator, a positive electrode and a negative electrode layered so as to sandwich the separator therebetween; a positive electrode current collector (arranged outside the positive electrode) and a negative electrode current collector (arranged outside the negative electrode) which sandwich the above layered object; and a battery jacket housing them. The layered object comprising of the positive electrode, the separator and the negative electrode is soaked in the electrolyte of the second embodiment.

FIG. 1 shows a schematic sectional view of the lithium-ion secondary battery according to a second embodiment. A lithium-ion secondary battery 100 shown in FIG. 1 has a separator 110; a positive electrode 120 and a negative electrode 130 which sandwich the separator 110; a positive electrode current collector 140 (arranged outside the positive electrode) and a negative electrode current collector 150 (arranged outside the negative electrode) which sandwich the layered object comprising of the aforementioned elements; and a battery jacket 160 housing them. The layered object comprising of the positive electrode 120, the separator 110 and the negative electrode 130, is soaked in an electrolyte.

Third Embodiment: Electrolyte

The electrolyte of the third embodiment contains a non-aqueous solvent, a lithium salt (A) and a compound(s) (D) having a silicon atom and represented by the following formula (10) and/or the following formula (11), and the content of the compound(s) (D) having a silicon atom in the electrolyte is 0.0010 mass % or more and 3.0 mass % or less.

$$SiFR^1R^2R^3 \quad (10)$$

(In the above formula (10), $R^1$, $R^2$ and $R^3$ each independently represent a hydrocarbon group having 1 to 10 carbon atoms, which may have a substituent.)

$$SiF_2R^4R^5 \quad (11)$$

(In the above formula (11), $R^4$ and $R^5$ each independently represent a hydrocarbon group having 1 to 10 carbon atoms, which may have a substituent.)

The same definitions as in the first embodiment can be applied to the non-aqueous solvent, lithium salt and the compound(s) (D) having a silicon atom and contents of these except the matters described below.

<Non-Aqueous Solvent>

The non-aqueous solvent preferably contains a cyclic carbonate and a linear carbonate. As the cyclic carbonate, which is not particularly limited, at least one selected from the group consisting of ethylene carbonate and propylene carbonate can be mentioned. As the linear carbonate, which is not particularly limited, at least one selected from the group consisting of dimethyl carbonate, diethyl carbonate and ethyl methyl carbonate can be mentioned. If such cyclic carbonate and linear carbonate are contained, the ion conductivity of the electrolyte tends to be more improved.

<Lithium Salt (A)>

As the lithium salt (A), $LiPF_6$ is preferably contained. If $LiPF_6$ is contained, the ion conductivity of the electrolyte tends to be more improved.

As the lithium salt (A), a lithium salt (C) having a boron atom and represented by the following formula (4) is preferably contained. If the lithium salt (C) having a boron atom and represented by the following formula (4) is contained, the cycle life of the lithium-ion secondary battery tends to be more improved.

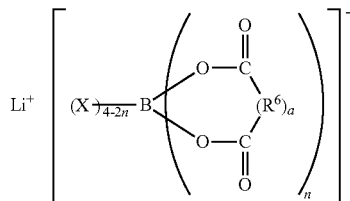

(4)

(In the above formula (4), a plurality of X each independently represent a halogen atom selected from the group consisting of a fluorine atom, a chlorine atom and a bromine atom; a plurality of $R^6$ each independently represent a hydrocarbon group having 1 to 10 carbon atoms, which may have a substituent; a represents an integer of 0 or 1; and n represents an integer of from 0 to 2.)

As the lithium salt (A), at least one selected from the group consisting of lithium difluorophosphate and lithium monofluorophosphate is also preferably contained. If at least one selected from the group consisting of lithium difluorophosphate and lithium monofluorophosphate is contained, the cycle performance of a lithium-ion secondary battery tends to be more improved.

<Compound(s) (D)>

The content of the compound(s) (D) having a silicon atom based on the electrolyte (100 mass %) is 0.0010 mass % or more and 3.0 mass % or less, preferably 0.0030 mass % or more and 2.0 mass % or less, more preferably 0.0050 mass % or more and 2.0 mass % or less, further preferably 0.010 mass % or more and 1.0 mass % or less and particularly preferably 0.020 mass % or more and 2.0 mass % or less. If the content of the compound(s) (D) having a silicon atom is 0.0010 mass % or more, a lithium-ion secondary battery having a satisfactory cycle life can be obtained. In contrast, if the content of the compound(s) (D) having a silicon atom is 3.0 mass % or less, the lithium-ion secondary battery can be suppressed from swelling. It is sufficient that the compound(s) (D) having a silicon atom is contained in an electrolyte; it may be added to the electrolyte during a preparation step thereof; or it may be produced by a reaction taking place in an electrolyte. The content of the compound(s) (D) having a silicon atom in an electrolyte can be determined by NMR measurement such as $^1$H-NMR or $^{19}$F-NMR measurement. The content of the compound(s) (D) having a silicon atom in the electrolyte of a lithium-ion secondary battery can be also determined, similarly to the above, i.e., by NMR measurement such as $^1$H-NMR or $^{19}$F-NMR.

<Compound (E)>

The electrolyte preferably contains a compound (E) which is an acid selected from the group consisting of sulfonic acid, carboxylic acid, and protonic acid(s) having a phosphorus atom and/or a boron atom, wherein at least one hydrogen of the acid is substituted with a substituent represented by the following formula (12). If the compound (E) is contained, the cycle performance of the lithium-ion secondary battery tends to be more improved.

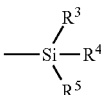

(12)

(In the above formula (12), $R^3$, $R^4$ and $R^5$ each independently represent an organic group having 1 to 10 carbon atoms, which may have a substituent.)

In particular, the compound (E) preferably contains a compound(s) represented by the following formula (13) and/or the following formula (14). The compounds represented by formula (13) and/or formula (14) can be the same as defined in the first embodiment.

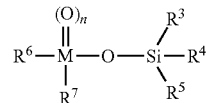

(13)

(In the above formula (13), M represents a phosphorus atom or a boron atom, and n represents 0 or 1 when M represents a phosphorus atom, n represents 0 when M represents a boron atom; $R^3$, $R^4$ and $R^5$ each independently represent an organic group having 1 to 10 carbon atoms, which may have a substituent; and $R^6$ and $R^7$ each independently represent a group selected from the group consisting of an OH group, an OLi group, an alkyl group having 1 to 10 carbon atoms, which may have a substituent, an alkoxy group having 1 to 10 carbon atoms, which may have a substituent, an siloxy group having 3 to 10 carbon atoms, an aryl group having 6 to 15 carbon atoms and an aryloxy group having 6 to 15 carbon atoms.)

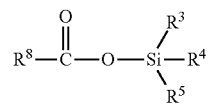

(14)

(In the above formula (14), $R^3$, $R^4$ and $R^5$ each independently represent an organic group having 1 to 10 carbon atoms, which may have a substituent; and $R^8$ represents an organic group having 1 to 20 carbon atoms, which may have a substituent.)

The content of compound (E) based on the electrolyte (100 mass %) is preferably 0.010 mass % or more and 10 mass % or less, more preferably 0.020 mass % or more and 10 mass % or less, further preferably 0.050 mass % or more and 8.0 mass % or less, further more preferably 0.10 mass % or more and 5.0 mass % or less and still more preferably 0.20 mass % or more and 4.0 mass % or less. If the content of the compound (E) is 0.010 mass % or more, the cycle life of the lithium-ion secondary battery tends to be more improved. In contrast, if the content of the compound (E) is 10 mass % or less, the output power of the battery tends to be more improved. The content of the compound (E) in an electrolyte can be determined by NMR measurement. The content of the compound (E) in the electrolyte of a lithium-ion secondary battery can be also determined by NMR measurement, similarly to the above.

The electrolyte according to the third embodiment is preferably used as an electrolyte for a non-aqueous electricity storage device.

Fourth Embodiment: Lithium-Ion Secondary Battery

The lithium-ion secondary battery (hereinafter also referred to simply as "battery") according to the fourth embodiment has
a positive electrode having a positive-electrode active material having a discharge capacity of 10 mAh/g or more at a potential of 4.4 V (vsLi/Li$^+$) or more,
a negative electrode having a negative-electrode active material, and
an electrolyte according to the third embodiment.

The same definitions as in the second embodiment are applied to the positive electrode, negative electrode, and a separator which can be optionally used, except the matters described below.

(Positive Electrode Active Material)

The battery of fourth embodiment, in order to realize a higher voltage, has a positive electrode containing a positive-electrode active material having a discharge capacity of 10 mAh/g or more at a potential of 4.4 V (vsLi/Li$^+$) or more. Even if such positive electrode is used, the battery of the second embodiment is useful since it can be operated at a high voltage and the recycle life can be improved.

The discharge capacity of the positive-electrode active material to be used in the fourth embodiment is 10 mAh/g or more at a potential of 4.4 V (vsLi/Li$^+$) or more, preferably 15 mAh/g or more, and more preferably 20 mAh/g or more. If the discharge capacity of the positive-electrode active material falls within the range, high energy density tends to be attained by operating at a high voltage. The upper limit of the discharge capacity of the positive-electrode active material at a potential of 4.4 V (vsLi/Li$^+$) or more, which is not particularly limited, is preferably 400 mAh/g or less. It should be noted that, the discharge capacity of the positive-electrode active material can be measured by the method described in Examples.

In the lithium-ion secondary battery according to fourth embodiment, the positive-electrode potential in terms of lithium standard at the time of full charge is preferably 4.4 V (vsLi/Li$^+$) or more, more preferably 4.45 V (vsLi/Li$^+$) or more and further preferably 4.5 V (vsLi/Li$^+$) or more. If the positive-electrode potential at the time of full charge is 4.4 V (vsLi/Li$^+$) or more, the charge-discharge capacity of the positive-electrode active material contained in the lithium-ion secondary battery tends to be more efficiently utilized. In addition, if the positive-electrode potential at the time of full charge is 4.4 V (vsLi/Li$^+$) or more, the energy density of the lithium-ion secondary battery tends to be more improved. It should be noted that, the positive-electrode potential in terms of lithium standard at the time of full charge can be controlled by controlling the voltage of the battery at the time of full charge. The upper limit of the positive-electrode potential at the time of full charge, which is not particularly limited, is preferably 5.2 V (vsLi/Li$^+$) or less.

As the positive-electrode active material, which is not particularly limited, at least one selected from the group consisting of an oxide represented by the following formula (5), an oxide represented by the following formula (6), a composite oxide represented by the following formula (7), a compound represented by the following formula (8) and a compound represented by the following formula (9), is preferable. If such positive-electrode active material is used, the structure stability of the positive-electrode active material tends to be more improved.

$$LiMn_{2-x}Ma_xO_4 \tag{5}$$

(In the above formula (5), Ma represents at least one selected from the group consisting of transition metals and x satisfies 0.2≤x≤0.7.)

$$LiMn_{1-u}Me_uO_2 \tag{6}$$

(In the above formula (6), Me represents at least one selected from the group consisting of transition metals excluding Mn and u satisfies 0.1≤u≤0.9.)

$$zLi_2McO_3\text{-}(1\text{-}z)LiMdO_2 \tag{7}$$

(In the above formula (7), Mc and Md each independently represent at least one selected from the group consisting of transition metals and z satisfies 0.1≤z≤0.9.)

$$LiMb_{1-y}Fe_yPO_4 \tag{8}$$

(In the above formula (8), Mb represents at least one selected from the group consisting of Mn and Co and y satisfies 0≤y≤0.9.)

$$Li_2MfPO_4F \tag{9}$$

(In the above formula (9), Mf represents at least one selected from the group consisting of transition metals.)

<Method for Preparing Electrolyte>

The electrolytes according to the first embodiment and third embodiment may be prepared by blending individual components in accordance with a known method or by a reaction taking place in the electrolyte, so as to obtain a predetermined composition. The preparation method using a reaction taking place in the electrolyte, more specifically, refers to preparing electrolytes according to the first embodiment and third embodiment by a reaction taking place within the battery.

<Method for Manufacturing Lithium-Ion Secondary Battery>

The lithium-ion secondary batteries according to the second embodiment and fourth embodiment can be assembled by using the aforementioned electrolyte, positive electrode, negative electrode and an optional separator in accordance with a known method. For example, a layered object is formed of a positive electrode and a negative electrode with a separator interposed between them. Then, a wound layered object is formed by winding the layered object. Alternatively, a layered object having a plurality of positive electrodes and negative electrodes alternately stacked along with separators that are interposed between each pair thereof is formed by folding the layered object formed above or stacking a plurality of the layered objects. Subsequently, the layered object formed above is housed in a battery case (jacket). The case is filled with the electrolyte according to the first embodiment or third embodiment to soak the layered object in the electrolyte and sealed. In this manner, a lithium-ion secondary battery can be manufactured. As the shape of the lithium-ion secondary batteries according to the second embodiment and fourth embodiment, which is not particularly limited, for example, a cylindrical type, an elliptical type, a prismatic type, a button type, a coin type, a flat shape and a laminate type are preferably employed.

EXAMPLES

Now, the present invention will be more specifically described by way of Examples and Comparative Examples, below. The present invention is not limited by the following Examples.

Example 1

<Synthesis of Positive-Electrode Active Material>
(Synthesis of $LiNi_{0.5}Mn_{1.5}O_4$)

Nickel sulfate and manganese sulfate in an amount ratio of 1:3 (in terms of the molar ratio of transition metal elements) were dissolved in water so as to obtain a total concentration of metal ions of 2 mol/L to prepare an aqueous solution of a nickel-manganese mixture. Subsequently, the aqueous solution of a nickel-manganese mixture was added dropwise to a 2 mol/L aqueous sodium carbonate solution (1650 mL) heated to 70° C. at an addition rate of 12.5 mL/min for 120 minutes. It should be noted that, during the dropwise addition, air was blown into the aqueous solution by bubbling at a flow rate of 200 mL/min while stirring. The precipitate generated by this was sufficiently washed with distilled water and dried to obtain a nickel manganese compound. The resultant nickel manganese compound and lithium carbonate particles having a particle size of 2 μm were weighed so as to obtain a molar ratio of lithium:nickel:manganese of 1:0.5:1.5 and dry-blended for one hour. Thereafter, the resultant mixture was calcined in an oxygen atmosphere at 1000° C. for 5 hours to obtain a positive-electrode active material represented by $LiNi_{0.5}Mn_{1.5}O_4$.

<Preparation of Positive Electrode>

The positive-electrode active material obtained as described above; a graphite powder (trade name "KS-6", manufactured by TIMCAL) and an acetylene black powder (trade name "HS-100", manufactured by Denki Kagaku Kogyo K. K.) serving as a conductive aid; and a polyvinylidene fluoride solution (trade name "L#7208", manufactured by KUREHA CORPORATION) serving as a binder, were blended in a solid-content mass ratio of 80:5:5:10. To the resultant mixture, N-methyl-2-pyrrolidone serving as a dispersing solvent was added so as to obtain a solid content of 35 mass % and stirred to prepare a slurry-state solution. The slurry-state solution was applied to one of the surfaces of an aluminum foil with a thickness of 20 μm, dried to remove the solvent and rolled by a roll press. The rolled aluminum foil was stamped out in the shape of a disc having a diameter of 16 mm to obtain a positive electrode.

Subsequently, using the positive electrode obtained above, a metal Li as a negative electrode, and a solution prepared by adding $LiPF_6$ in a concentration of 1 mol/L to a solvent mixture containing ethylene carbonate and ethyl methyl carbonate in a volume ratio of 1:2 as an electrolyte, a half-cell was assembled. The half-cell was charged up to 4.85 V at 0.02 C and then discharged at 0.1 C. In this manner, it was confirmed that the positive-electrode active material has a discharge capacity of 111 mAh/g at a potential of 4.4 V (vs$Li/Li^+$) or more.

<Preparation of Negative Electrode>

A graphite powder (trade name "OMAC1.2H/SS", manufactured by Osaka Gas Chemicals Co., Ltd.) and another graphite powder (trade name "SFG6", manufactured by TIMCAL) serving as a negative-electrode active material; and styrene-butadiene rubber (SBR) and an aqueous carboxymethyl cellulose solution serving as a binder, were blended in a solid-content mass ratio of 90:10:1.5:1.8. The resultant mixture was added to water serving as a dispersing solvent so as to have a solid-content concentration of 45 mass % to obtain a slurry-state solution. The slurry-state solution was applied to one of the surfaces of a copper foil with a thickness of 18 μm, dried to remove the solvent and rolled by a roll press. The rolled copper foil was stamped out in the shape of a disc having a diameter of 16 mm to obtain a negative electrode.

<Synthesis of $O=P(OSi(CH_3)_3)_2(OPF_5Li)$>

In a nitrogen atmosphere, 3.1 g of trimethylsilyl phosphate (manufactured by Aldrich) was added to acetonitrile (20 mL) at room temperature. To this mixture, 0.76 g of $LiPF_6$ (manufactured by Kishida Chemical Co., Ltd.) dissolved in acetonitrile (5 mL) was further added and stirred at 70° C. for 48 hours. Thereafter, acetonitrile and by-products etc. were removed at room temperature under reduced pressure to obtain a white solid substance. The obtained white solid substance was identified by NMR (JNM-GSX400G, manufactured by JEOL Ltd.). The white solid substance was dissolved in an EC/EMC solvent mixture and poured in the inner tube of NMR and a deuterated chloroform solvent was supplied to the outer tube, and then NMR measurement was carried out. The chemical shifts of a product are shown below.

$^1$H-NMR
0.49 ppm (18H, s)
$^{31}$P-NMR
−28 ppm (1P, s)
−148 ppm (1P, sext)
$^{19}$F-NMR
−62 ppm (4F, ddd)
−75 ppm (1F, d·quin)

From the results, the product was identified as $O=P(OSi(CH_3)_3)_2(OPF_5Li)$.

<Preparation of Electrolyte>

To 9.99 g of a solution (LBG00069, manufactured by Kishida Chemical Co., Ltd.), which was prepared by adding $LiPF_6$ in a concentration of 1 mol/L in a solvent mixture of ethylene carbonate and ethyl methyl carbonate with a volume ratio of 1:2, 0.01 g of $O=P(OSi(CH_3)_3)_2(OPF_5Li)$ was added to prepare electrolyte A. The content of $O=P(OSi(CH_3)_3)_2(OPF_5Li)$ in electrolyte A was 0.1 mass % and the content of $LiPF_6$ was 13 mass %.

<Preparation of Battery>

The positive electrode and negative electrode prepared as described above were layered on both sides of a separator (thickness: 25 μm, porosity: 50%, pore diameter: 0.1 μm to 1 μm) formed of a microporous polypropylene film, respectively. The resultant layered object was inserted in a disc-shaped battery case (jacket) made of stainless. Subsequently, the case was filled with 0.2 mL of electrolyte A prepared above to soak the layered object in electrolyte A and then sealed to prepare a lithium-ion secondary battery.

<Evaluation of Performance of Battery>

The lithium-ion secondary battery thus obtained was placed in a thermostatic bath (trade name "PLM-73S", manufactured by FUTABA Co., Ltd.) set at 25° C., which was connected to a charge and discharge device (trade name "ACD-01", manufactured by ASKA ELECTRONIC CO., LTD.), and allowed to stand still for 20 hours. Then, the battery was charged at a constant current of 0.2 C. After its voltage reached 4.8 V, the battery was charged at a constant voltage of 4.8 V for 8 hours, and thereafter discharged at a constant current of 0.2 C down to 3.0 V.

After the initial charge and discharge operation, the battery was charged in a thermostatic bath set at 50° C. at a constant current of 1.0 C up to 4.8 V and discharged at a constant current of 1.0 C down to 3.0 V. This series of charge-discharge operation was regarded as a cycle and the cycle was repeated further 29 times; in other words, 30 charge-discharge cycles were carried out. The discharge capacity values per mass of the positive-electrode active material on the first cycle and 30th cycle were obtained. As a result, the discharge capacity value of the lithium-ion secondary battery containing electrolyte A on the first cycle was as high as 102 mAh/g and the discharge capacity value thereof on the 30th cycle was as high as 80 mAh/g. The discharge capacity retention ratio, which was obtained by dividing the discharge capacity value on the 30th cycle by the discharge capacity value on the first cycle, was as high as 78%. It should be noted that, the positive-electrode potential in terms of lithium standard at the time of full charge, measured for a reassembled battery having the positive electrode, which was taken out from the battery of this example decomposed in an Ar glove box after being charged up to 4.8 V (full charge), and having a metal lithium as a counter electrode, was 4.85 V (vsLi/Li$^+$).

Example 2

To 9.95 g of a solution, which was prepared by adding LiPF$_6$ in a concentration of 1 mol/L in a solvent mixture of ethylene carbonate and ethyl methyl carbonate in a volume ratio of 1:2, 0.05 g of O=P(OSi(CH$_3$)$_3$)$_2$(OPF$_5$Li) was added to obtain electrolyte B. The content of O=P(OSi(CH$_3$)$_3$)$_2$(OPF$_5$Li) in electrolyte B was 0.5 mass % and the content of LiPF$_6$ was 13 mass %.

The performance of a lithium-ion secondary battery containing electrolyte B was evaluated in the same manner as in Example 1. As a result, the discharge capacity value of the lithium-ion secondary battery containing electrolyte B on the first cycle was as high as 107 mAh/g and the discharge capacity value thereof on the 30th cycle was as high as 89 mAh/g. The discharge capacity retention ratio, which was obtained by dividing the discharge capacity value on the 30th cycle by the discharge capacity value on the first cycle, was as high as 83%.

Example 3

To 9.90 g of a solution, which was prepared by adding LiPF$_6$ in a concentration of 1 mol/L in a solvent mixture of ethylene carbonate and ethyl methyl carbonate in a volume ratio of 1:2, 0.1 g of O=P(OSi(CH$_3$)$_3$)$_2$(OPF$_5$Li) was added to obtain electrolyte C. The content of O=P(OSi(CH$_3$)$_3$)$_2$(OPF$_5$Li) in electrolyte C was 1.0 mass % and the content of LiPF$_6$ in electrolyte C was 13 mass %.

The performance of a lithium-ion secondary battery containing electrolyte C was evaluated in the same manner as in Example 1. As a result, the discharge capacity value of the lithium-ion secondary battery containing electrolyte C on the first cycle was as high as 110 mAh/g and the discharge capacity value thereof on the 30th cycle was as high as 88 mAh/g. The discharge capacity retention ratio, which was obtained by dividing the discharge capacity value on the 30th cycle by the discharge capacity value on the first cycle, was as high as 80%.

Example 4

To 9.60 g of a solution, which was prepared by adding LiPF$_6$ in a concentration of 1 mol/L in a solvent mixture of ethylene carbonate and ethyl methyl carbonate in a volume ratio of 1:2, 0.4 g of O=P(OSi(CH$_3$)$_3$)$_2$(OPF$_5$Li) was added to obtain electrolyte D. The content of O=P(OSi(CH$_3$)$_3$)$_2$(OPF$_5$Li) in electrolyte D was 4.0 mass % and the content of LiPF$_6$ in electrolyte D was 13 mass %.

The performance of a lithium-ion secondary battery containing electrolyte D was evaluated in the same manner as in Example 1. As a result, the discharge capacity value of the lithium-ion secondary battery containing electrolyte C on the first cycle was as high as 100 mAh/g and the discharge capacity value thereof on the 30th cycle was as high as 81 mAh/g. The discharge capacity retention ratio, which was obtained by dividing the discharge capacity value on the 30th cycle by the discharge capacity value on the first cycle, was as high as 81%.

Example 5

<Synthesis of (CH$_3$)$_3$SiOCOC$_4$H$_8$COOPF$_5$Li>

In a nitrogen atmosphere, 2.9 g of bis(trimethylsilyl) adipate (C$_6$H$_{10}$O$_4$(Si(CH$_3$)$_3$)$_2$, manufactured by Gelest) was added to acetonitrile (20 mL) at room temperature. To this mixture, 0.76 g of LiPF$_6$ (manufactured by Kishida Chemical Co., Ltd.) dissolved in acetonitrile (5 mL) was further added and stirred at 70° C. for 48 hours. Thereafter, acetonitrile and by-products etc. were removed at room temperature under reduced pressure to obtain a white solid substance. The obtained white solid substance was identified by NMR (JNM-GSX400G, manufactured by JEOL Ltd.). The white solid substance was dissolved in an EC/EMC mixed solvent and poured in the inner tube of NMR and a deuterated chloroform solvent was supplied to the outer tube, and then NMR measurement was carried out. The chemical shifts of a product are shown below.

$^1$H-NMR
0.49 ppm (9H, s)
2.2 ppm (4H, m)
3.0 ppm (4H, m)
$^{31}$P-NMR
−146 ppm (1P, sext)
$^{19}$F-NMR
−67 ppm (4F, ddd)
−76 ppm (1F, d·quin)

From the results, the product was identified as (CH$_3$)$_3$SiOCOC$_4$H$_8$COOPF$_5$Li.

To 9.9 g of a solution, which was prepared by adding LiPF$_6$ in a concentration of 1 mol/L in a solvent mixture of ethylene carbonate and ethyl methyl carbonate in a volume ratio of 1:2, 0.1 g of (CH$_3$)$_3$SiOCOC$_4$H$_8$COOPF$_5$Li was added to obtain electrolyte E. The content of (CH$_3$)$_3$SiOCOC$_4$H$_8$COOPF$_5$Li in electrolyte E was 1 mass % and the content of LiPF$_6$ in electrolyte E was 13 mass %.

The performance of a lithium-ion secondary battery containing electrolyte E was evaluated in the same manner as in Example 1. As a result, the discharge capacity value of the lithium-ion secondary battery containing electrolyte E on the first cycle was as high as 111 mAh/g and the discharge capacity value thereof on the 30th cycle was as high as 87 mAh/g. The discharge capacity retention ratio, which was obtained by dividing the discharge capacity value on the 30th cycle by the discharge capacity value on the first cycle, was as high as 78%.

Example 6

To 9.90 g of a solution, which was prepared by adding LiPF$_6$ in a concentration of 1 mol/L in a solvent mixture containing ethylene carbonate and ethyl methyl carbonate in a volume ratio of 1:2, 0.05 g of O=P(OSi(CH$_3$)$_3$)$_2$(OPF$_5$Li) was added and then 0.05 g of LiB(C$_2$O$_4$)$_2$ was added to obtain electrolyte F. The content of O=P(OSi(CH$_3$)$_3$)$_2$(OPF$_5$Li) in electrolyte F was 0.5 mass %; the content of LiB(C$_2$O$_4$)$_2$ was 0.5 mass %; and the content of LiPF$_6$ was 13 mass %.

The performance of a lithium-ion secondary battery containing electrolyte F was evaluated in the same manner as in Example 1. As a result, the discharge capacity value of the lithium-ion secondary battery containing electrolyte F on the first cycle was as high as 114 mAh/g and the discharge capacity value thereof on the 30th cycle was as high as 95 mAh/g. The discharge capacity retention ratio, which was obtained by dividing the discharge capacity value on the 30th cycle by the discharge capacity value on the first cycle, was as high as 83%.

Example 7

To 9.92 g of a solution, which was prepared by adding $LiPF_6$ in a concentration of 1 mol/L in a solvent mixture of ethylene carbonate and ethyl methyl carbonate in a volume ratio of 1:2, 0.05 g of $O=P(OSi(CH_3)_3)_2(OPF_5Li)$ was added and then 0.03 g of lithium difluorophosphate ($LiPO_2F_2$) was added to obtain electrolyte G. The content of $O=P(OSi(CH_3)_3)_2(OPF_5Li)$ in electrolyte G was 0.5 mass %; the content of lithium difluorophosphate was 0.3 mass %; and the content of $LiPF_6$ was 13 mass %.

The performance of a lithium-ion secondary battery containing electrolyte G was evaluated in the same manner as in Example 1. As a result, the discharge capacity value of the lithium-ion secondary battery containing electrolyte G on the first cycle was as high as 109 mAh/g and the discharge capacity value thereof on the 30th cycle was as high as 91 mAh/g. The discharge capacity retention ratio, which was obtained by dividing the discharge capacity value on the 30th cycle by the discharge capacity value on the first cycle, was as high as 84%.

Example 8

To 9.87 g of a solution, which was prepared by adding $LiPF_6$ in a concentration of 1 mol/L in a solvent mixture of ethylene carbonate and ethyl methyl carbonate in a volume ratio of 1:2, 0.05 g of $O=P(OSi(CH_3)_3)_2(OPF_5Li)$ was added and then 0.03 g of lithium difluorophosphate was added and further 0.05 g of $LiB(C_2O_4)_2$ was added to obtain electrolyte H. The content of $O=P(OSi(CH_3)_3)_2(OPF_5Li)$ in electrolyte H was 0.5 mass %; the content of lithium difluorophosphate was 0.3 mass %; the content of $LiB(C_2O_4)_2$ was 0.5 mass %; and the content of $LiPF_6$ was 13 mass %.

The performance of a lithium-ion secondary battery containing electrolyte H was evaluated in the same manner as in Example 1. As a result, the discharge capacity value of the lithium-ion secondary battery containing electrolyte H on the first cycle was as high as 115 mAh/g and the discharge capacity value thereof on the 30th cycle was as high as 97 mAh/g. The discharge capacity retention ratio, which was obtained by dividing the discharge capacity value on the 30th cycle by the discharge capacity value on the first cycle, was as high as 84%.

Comparative Example 1

A solution, which was prepared by adding $LiPF_6$ in a concentration of 1 mol/L in a solvent mixture of ethylene carbonate and ethyl methyl carbonate in a volume ratio of 1:2 was designated as electrolyte I. The content of $LiPF_6$ in electrolyte I was 13 mass %.

The performance of a lithium-ion secondary battery containing electrolyte I was evaluated in the same manner as in Example 1. As a result, the discharge capacity value of the lithium-ion secondary battery containing electrolyte I on the first cycle was 96 mAh/g and the discharge capacity value thereof on the 30th cycle was 66 mAh/g. The discharge capacity retention ratio, which was obtained by dividing the discharge capacity value on the 30th cycle by the discharge capacity value on the first cycle, was 69%.

The results of Example 1 to Example 8 and Comparative Example 1 are collectively shown in Table 1. From the results, it is found that even in the case where a positive electrode having a potential (at the time of full charge) of as high as 4.85 V (vsLi/Li$^+$) was used, cycle life can be greatly improved by use of the electrolyte containing compound (B).

TABLE 1

| | | | Example 1 | Example 2 | Example 3 | Example 4 | Example 5 | Example 6 | Example 7 | Example 8 | Comparative Example 1 |
|---|---|---|---|---|---|---|---|---|---|---|---|
| Electrolyte | Non-aqueous solvent | Ethylene carbonate: volume ratio | 1 | 1 | 1 | 1 | 1 | 1 | 1 | 1 | 1 |
| | | Ethyl methyl carbonate: volume ratio | 2 | 2 | 2 | 2 | 2 | 2 | 2 | 2 | 2 |
| | Compound (B) | $O=P(OSi(CH_3)_3)_2(OPF_5Li)$: mass % | 0.1 | 0.5 | 1 | 4 | — | 0.5 | 0.5 | 0.5 | — |
| | | $(CH_3)_3SiOCOC_4H_8COOPF_5Li$: mass % | — | — | — | — | 1 | — | — | — | — |
| | Lithium salt (A) | $LiPF_6$: mass % | 13 | 13 | 13 | 13 | 13 | 13 | 13 | 13 | 13 |
| | Lithium salt (C) having a boron atom | $LiB(C_2O_4)_2$: mass % | — | — | — | — | — | 0.5 | — | 0.5 | — |
| | Compound (F) | $LiPO_2F_2$: mass % | — | — | — | — | — | — | 0.3 | 0.3 | — |
| Positive-electrode potential in terms of lithium standard at the time of full charge (V) | | | 4.85 | 4.85 | 4.85 | 4.85 | 4.85 | 4.85 | 4.85 | 4.85 | 4.85 |
| Evaluation of battery performance | | First cycle: mAh/g | 102 | 107 | 110 | 100 | 111 | 114 | 109 | 115 | 96 |
| | | 30th cycle: mAh/g | 80 | 89 | 88 | 81 | 87 | 95 | 91 | 97 | 66 |
| | | Capacity retention ratio: % | 78 | 83 | 80 | 81 | 78 | 83 | 84 | 84 | 69 |

Example 9

<Preparation of Positive Electrode>

$LiNi_{1/3}Mn_{1/3}Co_{1/3}O_2$ (manufactured by Nippon Chemical Industrial Co., Ltd.) as the positive-electrode active material, an acetylene black powder (manufactured by Denki Kagaku Kogyo K. K.) as the conductive aid, and a polyvinylidene fluoride solution (manufactured by KUREHA CORPORATION) as the binder were blended in a solid-content mass ratio of 90:6:4. To this mixture, N-methyl-2-pyrrolidone was added as a dispersing solvent so as to obtain a solid content of 40 mass % and further stirred to prepare a slurry-state solution. The slurry-state solution was applied to one of the surfaces of an aluminum foil with a thickness of 20 μm, dried to remove the solvent and rolled by a roll press to obtain a positive electrode. The rolled positive electrode was stamped out in the shape of a disc having a diameter of 16 mm to obtain a positive electrode.

Subsequently, using the positive electrode obtained above, a metal Li as a negative electrode and a solution prepared by adding $LiPF_6$ in a concentration of 1 mol/L to a solvent mixture of ethylene carbonate and ethyl methyl carbonate in a volume ratio of 1:2, as an electrolyte, a half-cell was assembled. The half-cell was charged at 0.02 C up to 4.6 V and thereafter discharged at 0.1 C. In this manner, it was confirmed that the positive-electrode active material has a discharge capacity of 23 mAh/g at a potential of 4.4 V (vsLi/Li$^+$) or more.

<Preparation of Negative Electrode>

A graphite powder (trade name "OMAC1.2H/SS", manufactured by Osaka Gas Chemicals Co., Ltd.) and another graphite powder (trade name "SFG6", manufactured by TIMCAL), serving as a negative-electrode active material, and styrene-butadiene rubber (SBR) and an aqueous carboxymethyl cellulose solution, serving as a binder, were blended in a solid-content mass ratio of 90:10:1.5:1.8. The resultant mixture was added to water serving as a dispersing solvent so that the solid-content concentration becomes 45 mass % to obtain a slurry-state solution. The slurry-state solution was applied to one of the surfaces of a copper foil with a thickness of 18 μm, dried to remove the solvent and rolled by a roll press. The rolled copper foil was stamped out in the shape of a disc having a diameter of 16 mm to obtain a negative electrode.

<Preparation of Battery>

The positive electrode and negative electrode prepared as described above were layered on two sides of a separator (thickness: 25 μm, porosity: 50%, pore diameter: 0.1 μm to 1 μm) formed of a microporous polypropylene film, respectively. The resultant layered object was inserted in a disc-shaped battery case (jacket) made of stainless. Subsequently, the case was filled with 0.2 mL of electrolyte A prepared in Example 1 to soak the layered object in electrolyte A and then sealed to prepare a lithium-ion secondary battery.

<Evaluation of Performance of Battery>

The lithium-ion secondary battery thus obtained was placed in a thermostatic bath (trade name "PLM-73S", manufactured by FUTABA Co., Ltd.) set at 25° C., connected to a charge and discharge device (trade name "ACD-01", manufactured by ASKA ELECTRONIC CO., LTD.) and allowed to stand still for 20 hours.

Then, the battery was charged at a constant current of 0.2 C. After the voltage reached 4.4 V, the battery was charged at a constant voltage of 4.4 V for 8 hours and thereafter, discharged at a constant current of 0.2 C down to 3.0 V.

After the initial charge and discharge operation, the battery was charged in a thermostatic bath set at 50° C. at a constant current of 1.0 C up to 4.4 V and discharged at a constant current of 1.0 C down to 3.0 V. This series of charge-discharge operation was regarded as a cycle and repeated further 99 times; in other words, 100 charge-discharge cycles were carried out. The discharge capacity values per mass of the positive-electrode active material on the first cycle and 100th cycle were obtained. As a result, the discharge capacity value of the lithium-ion secondary battery containing electrolyte A on the first cycle was as high as 158 mAh/g and the discharge capacity value thereof on the 100th cycle was as high as 106 mAh/g. The discharge capacity retention ratio, which was obtained by dividing the discharge capacity value on the 30th cycle by the discharge capacity value on the first cycle, was as high as 67%. It should be noted that, the positive-electrode potential in terms of lithium standard at the time of full charge, measured for a reassembled battery having the positive electrode, which was taken out from the battery of this example decomposed in an Ar glove box after being charged up to 4.4 V (full charge), and having a metal lithium as a counter electrode, was 4.45 V (vsLi/Li$^+$).

Example 10

A lithium-ion secondary battery was prepared in the same manner as in Example 9 except that electrolyte B obtained in Example 2 was used as the electrolyte, and the performance of the battery was evaluated. As a result, the discharge capacity of the lithium-ion secondary battery containing electrolyte B on the first cycle was as high as 157 mAh/g and the discharge capacity on the 100th cycle was as high as 116 mAh/g. The discharge capacity retention ratio, which was obtained by dividing the discharge capacity value on the 100th cycle by the discharge capacity value on the first cycle, was as high as 74%.

Example 11

A lithium-ion secondary battery was prepared in the same manner as in Example 9 except that electrolyte F obtained in Example 6 was used as the electrolyte, and the performance of the battery was evaluated. As a result, the discharge capacity of the lithium-ion secondary battery containing electrolyte F on the first cycle was as high as 161 mAh/g and the discharge capacity on the 100th cycle was as high as 123 mAh/g. The discharge capacity retention ratio, which was obtained by dividing the discharge capacity value on the 100th cycle by the discharge capacity value on the first cycle, was as high as 76%.

Example 12

A lithium-ion secondary battery was prepared in the same manner as in Example 9 except that electrolyte G obtained in Example 7 was used as the electrolyte, and the performance of the battery was evaluated. As a result, the discharge capacity of the lithium-ion secondary battery containing electrolyte G on the first cycle was as high as 159 mAh/g and the discharge capacity on the 100th cycle was as high as 119 mAh/g. The discharge capacity retention ratio, which was obtained by dividing the discharge capacity value on the 100th cycle by the discharge capacity value on the first cycle, was as high as 75%.

Example 13

A lithium-ion secondary battery was prepared in the same manner as in Example 9 except that electrolyte H obtained in Example 8 was used as the electrolyte, and the performance of the battery was evaluated. As a result, the discharge capacity of the lithium-ion secondary battery containing electrolyte H on the first cycle was as high as 161 mAh/g and the discharge capacity on the 100th cycle was as high as 127 mAh/g. The discharge capacity retention ratio, which was obtained by dividing the discharge capacity value on the 100th cycle by the discharge capacity value on the first cycle, was as high as 79%.

Comparative Example 2

A lithium-ion secondary battery was prepared in the same manner as in Example 9 except that electrolyte I obtained in Comparative Example 1 was used as the electrolyte and the performance of the battery was evaluated. As a result, the discharge capacity of the lithium-ion secondary battery containing electrolyte I on the first cycle was 157 mAh/g and the discharge capacity on the 100th cycle was 96 mAh/g. The discharge capacity retention ratio, which was obtained by dividing the discharge capacity value on the 100th cycle by the discharge capacity value on the first cycle, was 61%.

The results of Example 9 to Example 13 and Comparative Example 2 are collectively shown in Table 2. From the results, it is found that even in the case where a positive electrode having a potential (at the time of full charge) of as high as 4.45 V (vsLi/Li$^+$) was used, cycle life can be greatly improved by use of the electrolyte containing compound (B)

ethylene carbonate and ethyl methyl carbonate with a volume ratio of 1:2, 0.01 g of FSi(CH$_3$)$_3$ was added to obtain electrolyte K. The content of FSi(CH$_3$)$_3$ in electrolyte K was 0.1 mass % and the content of LiPF$_6$ was 13 mass %.

The performance of the lithium-ion secondary battery containing electrolyte K was evaluated in the same manner as in Example 1. As a result, the discharge capacity of the lithium-ion secondary battery containing electrolyte K on the first cycle was as high as 105 mAh/g and the discharge capacity on the 30th cycle was as high as 84 mAh/g. The discharge capacity retention ratio, which was obtained by dividing the discharge capacity value on the 30th cycle by the discharge capacity value on the first cycle, was as high as 80%.

Example 16

To 9.89 g of a solution, which was prepared by adding LiPF$_6$ in a concentration of 1 mol/L in a solvent mixture of

TABLE 2

|  |  |  | Example 9 | Example 10 | Example 11 | Example 12 | Example 13 | Comparative Example 2 |
|---|---|---|---|---|---|---|---|---|
| Electrolyte | Non-aqueous solvent | Ethylene carbonate: volume ratio | 1 | 1 | 1 | 1 | 1 | 1 |
|  |  | Ethyl methyl carbonate: volume ratio | 2 | 2 | 2 | 2 | 2 | 2 |
|  | Compound (B) | O=P(OSi(CH$_3$)$_3$)$_2$(OPF$_5$Li): mass % | 0.1 | 0.5 | 0.5 | 0.5 | 0.5 | — |
|  | Lithium salt (A) | LiPF$_6$: mass % | 13 | 13 | 13 | 13 | 13 | 13 |
|  | Lithium salt (C) having a boron atom | LiB(C$_2$O$_4$)$_2$: mass % | — | — | 0.5 | — | 0.5 | — |
|  | Compound (F) | LiPO$_2$F$_2$: mass % | — | — | — | 0.3 | 0.3 | — |
| Positive-electrode potential in terms of lithium standard at the time of full charge (V) |  |  | 4.45 | 4.45 | 4.45 | 4.45 | 4.45 | 4.45 |
| Evaluation of battery performance | First cycle: mAh/g |  | 158 | 157 | 161 | 159 | 161 | 157 |
|  | 100th cycle: mAh/g |  | 106 | 116 | 123 | 119 | 127 | 96 |
|  | Capacity retention ratio: % |  | 67 | 74 | 76 | 75 | 79 | 61 |

Example 14

To 9.95 g of a solution (LBG00069, manufactured by Kishida Chemical Co., Ltd.), which was prepared by adding LiPF$_6$ in a concentration of 1 mol/L in a solvent mixture of ethylene carbonate and ethyl methyl carbonate with a volume ratio of 1:2, 0.05 g of FSi(CH$_3$)$_3$ (364533, manufactured by Aldrich) was added to obtain electrolyte J. The content of FSi(CH$_3$)$_3$ in electrolyte J was 0.5 mass % and the content of LiPF$_6$ was 13 mass %.

The performance of the battery containing electrolyte J was evaluated in the same manner as in Example 1. As a result, the discharge capacity of the lithium-ion secondary battery containing electrolyte J on the first cycle was as high as 104 mAh/g and the discharge capacity on the 30th cycle was as high as 82 mAh/g. The discharge capacity retention ratio, which was obtained by dividing the discharge capacity value on the 30th cycle by the discharge capacity value on the first cycle, was as high as 79%. It should be noted that, the positive-electrode potential in terms of lithium standard at the time of full charge, measured for a reassembled battery having the positive electrode, which was taken out from the battery of this example decomposed in an Ar glove box after being charged up to 4.8 V (full charge), and having a metal lithium as a counter electrode, was 4.85 V (vsLi/Li$^+$).

Example 15

To 9.99 g of a solution, which was prepared by adding LiPF$_6$ in a concentration of 1 mol/L in a solvent mixture of ethylene carbonate and ethyl methyl carbonate with a volume ratio of 1:2, 0.1 g of lithium bisoxalate borate (hereinafter referred to as "LiBOB", manufactured by Rockwood) represented by formula (4) and 0.01 g of FSi(CH$_3$)$_3$ were added to obtain electrolyte L. The content of LiBOB in electrolyte L was 1 mass %; the content of FSi(CH$_3$)$_3$ was 0.1 mass %; and the content of LiPF$_6$ was 13 mass %.

The performance of the lithium-ion secondary battery containing electrolyte L was evaluated in the same manner as in Example 1. As a result, the discharge capacity of the lithium-ion secondary battery containing electrolyte L on the first cycle was as high as 115 mAh/g and the discharge capacity on the 30th cycle was as high as 97 mAh/g. The discharge capacity retention ratio, which was obtained by dividing the discharge capacity value on the 30th cycle by the discharge capacity value on the first cycle, was as high as 84%.

Example 17

To 9.96 g of a solution, which was prepared by adding LiPF$_6$ in a concentration of 1 mol/L in a solvent mixture containing ethylene carbonate and ethyl methyl carbonate in a volume ratio of 1:2, 0.03 g of lithium difluorophosphate (LiPO$_2$F$_2$) and 0.01 g of FSi(CH$_3$)$_3$ were added to obtain electrolyte M. The content of lithium difluorophosphate in electrolyte M was 0.3 mass %; the content of FSi(CH$_3$)$_3$ was 0.1 mass %; and the content of LiPF$_6$ was 13 mass %.

The performance of the lithium-ion secondary battery containing electrolyte M was evaluated in the same manner as in Example 1. As a result, the discharge capacity of the lithium-ion secondary battery containing electrolyte M on the first cycle was as high as 108 mAh/g and the discharge capacity on the 30th cycle was as high as 85 mAh/g. The discharge capacity retention ratio, which was obtained by dividing the discharge capacity value on the 30th cycle by the discharge capacity value on the first cycle, was as high as 79%.

Example 18

To 9.86 g of a solution, which was prepared by adding $LiPF_6$ in a concentration of 1 mol/L in a solvent mixture of ethylene carbonate and ethyl methyl carbonate with a volume ratio of 1:2, 0.1 g of LiBOB, 0.03 g of lithium difluorophosphate and 0.01 g of $FSi(CH_3)_3$ were added to obtain electrolyte N. The content of LiBOB in electrolyte N was 1 mass %; the content of lithium difluorophosphate was 0.3 mass %; the content of $FSi(CH_3)_3$ was 0.1 mass %; and the content of $LiPF_6$ was 13 mass %.

The performance of the lithium-ion secondary battery containing electrolyte N was evaluated in the same manner as in Example 1. As a result, the discharge capacity of the lithium-ion secondary battery containing electrolyte N on the first cycle was as high as 113 mAh/g and the discharge capacity on the 30th cycle was as high as 99 mAh/g. The discharge capacity retention ratio, which was obtained by dividing the discharge capacity value on the 30th cycle by the discharge capacity value on the first cycle, was as high as 88%.

Example 19

To 9.89 g of a solution, which was prepared by adding $LiPF_6$ in a concentration of 1 mol/L in a solvent mixture of ethylene carbonate and ethyl methyl carbonate with a volume ratio of 1:2, 0.1 g of $O=P(OSi(CH_3)_3)_3$ was added and then 0.01 g of $FSi(CH_3)_3$ was added to obtain electrolyte O. The content of $O=P(OSi(CH_3)_3)_3$ in electrolyte O was 1 mass %, the content of $FSi(CH_3)_3$ was 0.1 mass %, and the content of $LiPF_6$ was 13 mass %.

The performance of the lithium-ion secondary battery containing electrolyte O was evaluated in the same manner as in Example 1. As a result, the discharge capacity of the lithium-ion secondary battery containing electrolyte O on the first cycle was as high as 110 mAh/g and the discharge capacity on the 30th cycle was as high as 91 mAh/g. The discharge capacity retention ratio, which was obtained by dividing the discharge capacity value on the 30th cycle by the discharge capacity value on the first cycle, was as high as 83%.

Example 20

To 9.87 g of a solution, which was prepared by adding $LiPF_6$ in a concentration of 1 mol/L in a solvent mixture of ethylene carbonate and ethyl methyl carbonate with a volume ratio of 1:2, 0.1 g of $O=P(OSi(CH_3)_3)_3$ was added and then 0.03 g of $FSi(CH_3)_3$ was added to obtain electrolyte P. The content of $O=P(OSi(CH_3)_3)_3$ in electrolyte P was 1 mass %, the content of $FSi(CH_3)_3$ was 0.3 mass %, and the content of $LiPF_6$ was 13 mass %.

The performance of the lithium-ion secondary battery containing electrolyte P was evaluated in the same manner as in Example 1. As a result, the discharge capacity of the lithium-ion secondary battery containing electrolyte P on the first cycle was as high as 110 mAh/g and the discharge capacity on the 30th cycle was as high as 90 mAh/g. The discharge capacity retention ratio, which was obtained by dividing the discharge capacity value on the 30th cycle by the discharge capacity value on the first cycle, was as high as 82%.

Example 21

To 9.89 g of a solution, which was prepared by adding $LiPF_6$ in a concentration of 1 mol/L in a solvent mixture of ethylene carbonate and ethyl methyl carbonate with a volume ratio of 1:2, 0.1 g of bis(trimethylsilyl) adipate was added and then 0.01 g of $FSi(CH_3)_3$ was added to obtain electrolyte Q. The content of bis(trimethylsilyl) adipate in electrolyte Q was 1 mass % and the content of $FSi(CH_3)_3$ was 0.1 mass %; and the content of $LiPF_6$ was 13 mass %.

The performance of the lithium-ion secondary battery containing electrolyte Q was evaluated in the same manner as in Example 1. As a result, the discharge capacity of the lithium-ion secondary battery containing electrolyte Q on the first cycle was as high as 112 mAh/g and the discharge capacity on the 30th cycle was as high as 90 mAh/g. The discharge capacity retention ratio, which was obtained by dividing the discharge capacity value on the 30th cycle by the discharge capacity value on the first cycle, was as high as 80%.

Example 22

To 9.84 g of a solution, which was prepared by adding $LiPF_6$ in a concentration of 1 mol/L in a solvent mixture of ethylene carbonate and ethyl methyl carbonate in a volume ratio of 1:2, 0.1 g of $O=P(OSi(CH_3)_3)_3$ was added and then 0.05 g of LiBOB was added, and further 0.01 g of $FSi(CH_3)_3$ were added to obtain electrolyte R. The content of $O=P(OSi(CH_3)_3)_3$ in electrolyte R was 1 mass %, the content of LiBOB was 0.5 mass %, the content of $FSi(CH_3)_3$ was 0.1 mass %; and the content of $LiPF_6$ was 13 mass %.

The performance of the lithium-ion secondary battery containing electrolyte R was evaluated in the same manner as in Example 1. As a result, the discharge capacity of the lithium-ion secondary battery containing electrolyte R on the first cycle was as high as 115 mAh/g and the discharge capacity on the 30th cycle was as high as 101 mAh/g. The discharge capacity retention ratio, which was obtained by dividing the discharge capacity value on the 30th cycle by the discharge capacity value on the first cycle, was as high as 88%.

Comparative Example 3

The performance of the lithium-ion secondary battery containing electrolyte I prepared in Comparative Example 1 was evaluated in the same manner as in Example 1. As a result, the discharge capacity of the lithium-ion secondary battery containing electrolyte I on the first cycle was 96 mAh/g and the discharge capacity on the 30th cycle was 66 mAh/g. The discharge capacity retention ratio, which was obtained by dividing the discharge capacity value on the 30th cycle by the discharge capacity value on the first cycle, was 69%.

Comparative Example 4

To 9.9 g of a solution, which was prepared by adding $LiPF_6$ in a concentration of 1 mol/L in a solvent mixture of ethylene carbonate and ethyl methyl carbonate in a volume ratio of 1:2, 0.1 g of O=P(OSi(CH$_3$)$_3$)$_3$ was added to obtain electrolyte S. The content of O=P(OSi(CH$_3$)$_3$)$_3$ in electrolyte S was 1 mass % and the content of LiPF$_6$ was 13 mass %.

The performance of the lithium-ion secondary battery containing electrolyte S was evaluated in the same manner as in Example 1. As a result, the discharge capacity of the lithium-ion secondary battery containing electrolyte S on the first cycle was 104 mAh/g and the discharge capacity on the 30th cycle was 79 mAh/g. The discharge capacity retention ratio, which was obtained by dividing the discharge capacity value on the 30th cycle by the discharge capacity value on the first cycle, was 76%.

The results of Example 14 to Example 22, Comparative Example 3 and Comparative Example 4 are collectively shown in Table 3. From the results, it is found that even in the case where a positive electrode having a potential (at the time of full charge) of as high as 4.85 V (vsLi/Li$^+$) was used, cycle life can be greatly improved by use of the electrolyte containing compound(s) (D) having a silicon atom.

battery of this example decomposed in an Ar glove box after being charged up to 4.4 V (full charge), and having a metal lithium as a counter electrode, was 4.45 V (vsLi/Li$^+$).

Example 24

A lithium-ion secondary battery was prepared in the same manner as in Example 9 except that electrolyte K obtained in Example 15 was used as the electrolyte and the performance of the battery was evaluated. As a result, the discharge capacity of the lithium-ion secondary battery containing electrolyte B on the first cycle was as high as 165 mAh/g and the discharge capacity on the 100th cycle was as high as 126 mAh/g. The discharge capacity retention ratio, which was obtained by dividing the discharge capacity value on the 30th cycle by the discharge capacity value on the first cycle, was as high as 76%.

Example 25

A lithium-ion secondary battery was prepared in the same manner as in Example 9 except that electrolyte N obtained

TABLE 3

| | | | Example 14 | Example 15 | Example 16 | Example 17 | Example 18 | Example 19 | Example 20 | Example 21 | Example 22 | Comparative Example 3 | Comparative Example 4 |
|---|---|---|---|---|---|---|---|---|---|---|---|---|---|
| Electrolyte | Non-aqueous solvent | Ethylene carbonate: volume ratio | 1 | 1 | 1 | 1 | 1 | 1 | 1 | 1 | 1 | 1 | 1 |
| | | Ethyl methyl carbonate: volume ratio | 2 | 2 | 2 | 2 | 2 | 2 | 2 | 2 | 2 | 2 | 2 |
| | Lithium salt (A) | LiPF$_6$: mass % | 13 | 13 | 13 | 13 | 13 | 13 | 13 | 13 | 13 | 13 | 13 |
| | Lithium salt (C) having a boron atom | LiBOB: mass % | — | — | 1 | — | 1 | — | — | — | 0.5 | — | — |
| | Compound (F) | LiPO$_2$F$_2$: mass % | — | — | — | 0.3 | 0.3 | — | — | — | — | — | — |
| | Compound (E) | O=P(OSi(CH$_3$)$_3$)$_3$: mass % | — | — | — | — | — | 1 | 1 | — | 1 | — | 1 |
| | | Bis(trimethylsilyl) adipate: mass % | — | — | — | — | — | — | — | 1 | — | — | — |
| | Compound(s) (D) having a silicon atom | FSi(CH$_3$)$_3$: mass % | 0.5 | 0.1 | 0.1 | 0.1 | 0.1 | 0.1 | 0.3 | 0.1 | 0.1 | — | — |
| Positive-electrode potential in terms of lithium standard at the time of full charge (V) | | | 4.85 | 4.85 | 4.85 | 4.85 | 4.85 | 4.85 | 4.85 | 4.85 | 4.85 | 4.85 | 4.85 |
| Evaluation of battery performance | First cycle mAh/g | | 104 | 105 | 115 | 108 | 113 | 110 | 110 | 112 | 115 | 96 | 104 |
| | 30th cycle: mAh/g | | 82 | 84 | 97 | 85 | 99 | 91 | 90 | 90 | 101 | 66 | 79 |
| | Capacity retention ratio: % | | 79 | 80 | 84 | 79 | 88 | 83 | 82 | 80 | 88 | 69 | 76 |

Example 23

A lithium-ion secondary battery was prepared in the same manner as in Example 9 except that electrolyte J obtained in Example 14 was used as the electrolyte and the performance of the battery was evaluated. As a result, the discharge capacity of the lithium-ion secondary battery containing electrolyte J on the first cycle was 157 mAh/g and the discharge capacity on the 100th cycle was as high as 109 mAh/g. The discharge capacity retention ratio, which was obtained by dividing the discharge capacity value on the 100th cycle by the discharge capacity value on the first cycle, was as high as 69%. It should be noted that, the positive-electrode potential in terms of lithium standard at the time of full charge, measured for a reassembled battery having the positive electrode, which was taken out from the in Example 18 was used as the electrolyte and the performance of the battery was evaluated. As a result, the discharge capacity of the lithium-ion secondary battery containing electrolyte N on the first cycle was as high as 162 mAh/g and the discharge capacity on the 100th cycle was as high as 128 mAh/g. The discharge capacity retention ratio, which was obtained by dividing the discharge capacity value on the 30th cycle by the discharge capacity value on the first cycle, was as high as 79%.

Example 26

To 9.94 g of a solution, which was prepared by adding LiPF$_6$ in a concentration of 1 mol/L in a solvent mixture of ethylene carbonate and ethyl methyl carbonate in a volume ratio of 1:2, 0.05 g of O=P(OSi(CH$_3$)$_3$)$_3$ was added and then 0.01 g of $FSi(CH_3)_3$ was added to obtain electrolyte T. The content of $O=P(OSi(CH_3)_3)_3$ in electrolyte T was 0.5 mass %, the content of $FSi(CH_3)_3$ was 0.1 mass %, and the content of $LiPF_6$ was 13 mass %.

The performance of the lithium-ion secondary battery containing electrolyte T was evaluated in the same manner as in Example 9. As a result, the discharge capacity of the lithium-ion secondary battery containing electrolyte T on the first cycle was as high as 162 mAh/g and the discharge capacity on the 30th cycle was as high as 129 mAh/g. The discharge capacity retention ratio, which was obtained by dividing the discharge capacity value on the 30th cycle by the discharge capacity value on the first cycle, was as high as 80%.

Example 27

To 9.89 g of a solution, which was prepared by adding $LiPF_6$ in a concentration of 1 mol/L in a solvent mixture of ethylene carbonate and ethyl methyl carbonate with a volume ratio of 1:2, 0.05 g of $O=P(OSi(CH_3)_3)_3$ was added and then 0.05 g of LiBOB was added, and further 0.01 g of $FSi(CH_3)_3$ was added to obtain electrolyte U. The content of $O=P(OSi(CH_3)_3)_3$ in electrolyte U was 0.5 mass %, the content of LiBOB was 0.5 mass %, the content of $FSi(CH_3)_3$ was 0.1 mass %, and the content of $LiPF_6$ was 13 mass %.

The performance of the lithium-ion secondary battery containing electrolyte U was evaluated in the same manner as in Example 9. As a result, the discharge capacity of the lithium-ion secondary battery containing electrolyte U on the first cycle was as high as 161 mAh/g and the discharge capacity on the 30th cycle was as high as 131 mAh/g. The discharge capacity retention ratio, which was obtained by dividing the discharge capacity value on the 30th cycle by the discharge capacity value on the first cycle, was as high as 81%.

Comparative Example 5

A lithium-ion secondary battery was prepared in the same manner as in Example 9 except that electrolyte I obtained in Comparative Example 1 was used as the electrolyte and the performance of the battery was evaluated. As a result, the discharge capacity of the lithium-ion secondary battery containing electrolyte I on the first cycle was 157 mAh/g and the discharge capacity on the 100th cycle was 96 mAh/g. The discharge capacity retention ratio, which was obtained by dividing the discharge capacity value on the 100th cycle by the discharge capacity value on the first cycle, was 61%.

The results of Example 23 to Example 27 and Comparative Example 5 are collectively shown in Table 4. From the results, it is found that cycle life can be greatly improved by use of the electrolyte containing compound(s) (D) having a silicon atom even if a positive electrode having a potential (at the time of full charge) of as high as 4.45 V (vsLi/Li$^+$) is used.

TABLE 4

|  |  |  | Example 23 | Example 24 | Example 25 | Example 26 | Example 27 | Comparative Example 5 |
|---|---|---|---|---|---|---|---|---|
| Electrolyte | Non-aqueous solvent | Ethylene carbonate: volume ratio | 1 | 1 | 1 | 1 | 1 | 1 |
|  |  | Ethyl methyl carbonate: volume ratio | 2 | 2 | 2 | 2 | 2 | 2 |
|  | Lithium salt (A) | $LiPF_6$: mass % | 13 | 13 | 13 | 13 | 13 | 13 |
|  | Lithium salt (C) having a boron atom | LiBOB: mass % | — | — | 1 | — | 0.5 | — |
|  | Compound (F) | $LiPO_2F_2$: mass % | — | — | 0.3 | — | — | — |
|  | Compound (E) | $O=P(OSi(CH_3)_3)_3$: mass % | — | — | — | 0.5 | 0.5 | — |
|  | Compound(s) (D) having a silicon atom | $FSi(CH_3)_3$: mass % | 0.5 | 0.1 | 0.1 | 0.1 | 0.1 | — |
| Positive-electrode potential in terms of lithium standard at the time of full charge (V) |  |  | 4.45 | 4.45 | 4.45 | 4.45 | 4.45 | 4.45 |
| Evaluation of battery performance | First cycle mAh/g |  | 157 | 165 | 162 | 162 | 161 | 157 |
|  | 100th cycle: mAh/g |  | 109 | 126 | 128 | 129 | 131 | 96 |
|  | Capacity retention ratio: % |  | 69 | 76 | 79 | 80 | 81 | 61 |

From the foregoing, it was demonstrated that according to the present invention, a lithium-ion secondary battery having long cycle life can be realized even with a positive electrode containing a positive-electrode active material which is operated at a high voltage of 4.4 V (vsLi/Li$^+$) or more.

This application was based on Japanese Patent Application No. 2013-209015 filed on Oct. 4, 2013 with the Japanese Patent Office and Japanese Patent Application No. 2013-209009 filed on Oct. 4, 2013 with the Japanese Patent Office, the contents of which are incorporated herein by reference.

INDUSTRIAL APPLICABILITY

The electrolyte of the invention for a non-aqueous electricity storage device and lithium-ion secondary battery using the electrolyte have industrial applicability as power sources for consumer appliances and as power sources for automobiles.

REFERENCE SIGNS LIST

100 . . . Lithium-ion secondary battery, 110 . . . Separator, 120 . . . Positive electrode, 130 . . . Negative electrode, 140 . . . Positive electrode current collector, 150 . . . Negative electrode current collector, 160 . . . Battery jacket.

The invention claimed is:

1. An electrolyte comprising:
   a non-aqueous solvent;
   a lithium salt (A); and
   at least one compound (B) selected from the group consisting of a compound represented by the following formula (1), a compound represented by the following formula (2) and a compound having a constitutional unit represented by the following formula (3a) and a constitutional unit represented by the following formula (3b),

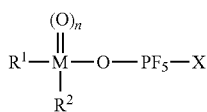
(1)

wherein X represents a Li atom or a hydrogen atom; M represents a P atom or a B atom; n represents an integer of 0 when M represents a B atom, and n represents an integer of 0 or 1 when M represents a P atom; and $R^1$ and $R^2$ each independently represent a group selected from the group consisting of an OH group, an OLi group, an alkyl group having 1 to 10 carbon atoms, which may have a substituent, an alkoxy group having 1 to 10 carbon atoms, which may have a substituent, an aryl group having 6 to 10 carbon atoms, which may have a substituent, an aryloxy group having 6 to 10 carbon atoms, which may have a substituent, and an siloxy group having 3 to 10 carbon atoms,

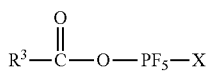
(2)

wherein X represents a Li atom or a hydrogen atom; and $R^3$ represents a hydrocarbon group having 1 to 20 carbon atoms, which may have a substituent,

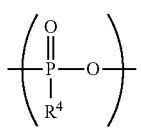
(3a)

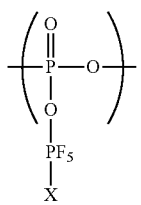
(3b)

wherein $R^4$ represents a group selected from the group consisting of an OH group, an OLi group, an alkyl group having 1 to 10 carbon atoms, which may have a substituent, an alkoxy group having 1 to 10 carbon atoms, which may have a substituent, an aryl group having 6 to 10 carbon atoms, which may have a substituent, an aryloxy group having 6 to 10 carbon atoms, which may have a substituent, and an siloxy group having 3 to 10 carbon atoms; and X represents a Li atom or a hydrogen atom.

2. The electrolyte according to claim 1, wherein the content of the compound (B) based on 100 mass % of the electrolyte is 0.010 mass % or more and 10 mass % or less.

3. The electrolyte according to claim 1, wherein the lithium salt (A) comprises a lithium salt (C) having a boron atom and represented by the following formula (4),

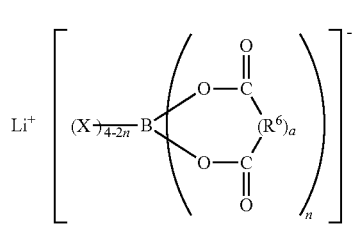
(4)

wherein a plurality of X each independently represent a halogen atom selected from the group consisting of a fluorine atom, a chlorine atom and a bromine atom; and a plurality of $R^6$ each independently represent a hydrocarbon group having 1 to 10 carbon atoms, which may have a substituent, a represents an integer of 0 or 1, and n represents an integer of 0 to 2.

4. A lithium-ion secondary battery comprising:
   a positive electrode comprising a positive-electrode active material;
   a negative electrode comprising a negative-electrode active material; and
   the electrolyte according to claim 1.

5. The lithium-ion secondary battery according to claim 4, wherein the positive-electrode active material has a discharge capacity of 10 mAh/g or more at a potential of 4.4 V (vsLi/Li$^+$) or more.

6. The lithium-ion secondary battery according to claim 4, wherein the positive-electrode active material comprises at least one selected from the group consisting of an oxide represented by formula (5), an oxide represented by formula (6), a composite oxide represented by formula (7), a compound represented by formula (8) and a compound represented by formula (9),

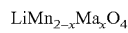
$LiMn_{2-x}Ma_xO_4$ (5)

wherein Ma represents at least one selected from the group consisting of transition metals and x satisfies $0.2 \le x \le 0.7$,

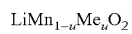
$LiMn_{1-u}Me_uO_2$ (6)

wherein Me represents at least one selected from the group consisting of transition metals excluding Mn and u satisfies $0.1 \le u \le 0.9$,

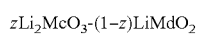
$zLi_2McO_3\text{-}(1-z)LiMdO_2$ (7)

wherein Mc and Md each independently represent at least one selected from the group consisting of transition metals and z satisfies $0.1 \le z \le 0.9$,

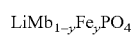
$LiMb_{1-y}Fe_yPO_4$ (8)

wherein Mb represents at least one selected from the group consisting of Mn and Co and y satisfies $0 \le y \le 0.9$,

$Li_2MfPO_4F$ (9)

wherein Mf represents at least one selected from the group consisting of transition metals.

7. The lithium-ion secondary battery according to claim 4, wherein the positive-electrode potential in terms of lithium standard at the time of full charge is 4.4 V (vsLi/Li$^+$) or more.

8. The lithium-ion secondary battery according to claim 5, wherein the positive-electrode active material comprises at least one selected from the group consisting of an oxide represented by formula (5), an oxide represented by formula (6), a composite oxide represented by formula (7), a compound represented by formula (8) and a compound represented by formula (9), $$\text{LiMn}_{2-x}\text{Ma}_x\text{O}_4 \tag{5}$$

wherein Ma represents at least one selected from the group consisting of transition metals and x satisfies $0.2 \le x \le 0.7$, $$\text{LiMn}_{1-u}\text{Me}_u\text{O}_2 \tag{6}$$

wherein Me represents at least one selected from the group consisting of transition metals excluding Mn and u satisfies $0.1 \le u \le 0.9$, $$z\text{Li}_2\text{McO}_3\text{-}(1-z)\text{LiMdO}_2 \tag{7}$$

wherein Mc and Md each independently represent at least one selected from the group consisting of transition metals and z satisfies $0.1 \le z \le 0.9$, $$\text{LiMb}_{1-y}\text{Fe}_y\text{PO}_4 \tag{8}$$

wherein Mb represents at least one selected from the group consisting of Mn and Co and y satisfies $0 \le y \le 0.9$, $$\text{Li}_2\text{MfPO}_4\text{F} \tag{9}$$

wherein Mf represents at least one selected from the group consisting of transition metals.

9. The lithium-ion secondary battery according to claim 8, wherein the positive-electrode potential in terms of lithium standard at the time of full charge is 4.4 V (vsLi/Li$^+$) or more.

* * * * *